US009998603B2

(12) United States Patent
Bennett

(10) Patent No.: US 9,998,603 B2
(45) Date of Patent: Jun. 12, 2018

(54) ATTACHING MULTIPLE PHONE LINES TO A SINGLE MOBILE OR LANDLINE PHONE

(71) Applicant: World Emergency Network—Nevada, Ltd., Carson City, NV (US)

(72) Inventor: Christopher Ryan Bennett, St. Petersburg, FL (US)

(73) Assignee: World Emergency Network—Nevada, Ltd., Carson City, NV (US)

(*) Notice: Subject to any disclaimer, the term of this patent is extended or adjusted under 35 U.S.C. 154(b) by 0 days. days.

(21) Appl. No.: 13/839,388

(22) Filed: Mar. 15, 2013

(65) Prior Publication Data

US 2013/0208878 A1 Aug. 15, 2013

Related U.S. Application Data

(63) Continuation-in-part of application No. 13/539,050, filed on Jun. 29, 2012.

(Continued)

(51) Int. Cl.
*H04M 7/00* (2006.01)
*H04M 3/54* (2006.01)

(Continued)

(52) U.S. Cl.
CPC ......... *H04M 3/54* (2013.01); *H04M 3/42229* (2013.01); *H04M 1/72519* (2013.01); *H04M 2250/66* (2013.01)

(58) Field of Classification Search
CPC .. H04L 63/30; H04L 12/2602; H04M 7/0057; H04M 7/006; H04M 1/72519;

(Continued)

(56) References Cited

U.S. PATENT DOCUMENTS 5,734,659 A 3/1998 Mann et al.
5,974,309 A 10/1999 Foti
(Continued)

FOREIGN PATENT DOCUMENTS

CN 1343425 A 4/2002
CN 1852466 A 10/2006
(Continued)

OTHER PUBLICATIONS

Office Action for U.S. Appl. No. 14/086,960, dated May 1, 2014, 10 Pages.

(Continued)

*Primary Examiner* — Ahmad F. Matar
*Assistant Examiner* — Kharye Pope
(74) *Attorney, Agent, or Firm* — Fenwick & West LLP

(57) ABSTRACT

Agencies issue multiple devices to personnel for maintaining distinct identities over the course of assigned investigations. To provide flexible capabilities to agencies, a phone is converted for use with multiple attached telephone numbers. Accordingly, a single phone may be used to manage multiple identities over the course of one or more investigations. Using a multiple attached number, a given device can place and receive calls over the network to and from contacts. In addition to providing multiple attached numbers, calls using the multiple attached numbers may be monitored live and recorded to establish evidence.

23 Claims, 11 Drawing Sheets

Related U.S. Application Data

(60) Provisional application No. 61/503,586, filed on Jun. 30, 2011.

(51) Int. Cl.
*H04M 3/42* (2006.01)
*H04L 12/66* (2006.01)
*H04M 1/725* (2006.01)

(58) Field of Classification Search
CPC ......... H04M 3/42042; H04M 3/42059; H04M 7/0084; H04M 3/2281; H04M 3/42229; H04Q 2213/13109
USPC ... 379/211.04, 201.03, 88.01, 219, 220, 222, 379/311
See application file for complete search history.

(56) References Cited

U.S. PATENT DOCUMENTS

| | | | |
|---|---|---|---|
| 6,233,313 B1* | 5/2001 | Farris ................. | H04L 12/2602 379/112.01 |
| 6,301,246 B1 | 10/2001 | Shaffer et al. | |
| 6,449,474 B1* | 9/2002 | Mukherjee .......... | H04M 3/2281 379/201.01 |
| 6,553,025 B1 | 4/2003 | Kung et al. | |
| 7,181,017 B1 | 2/2007 | Nagel et al. | |
| 7,626,980 B1* | 12/2009 | Croak ................ | H04L 12/2602 370/352 |
| 7,839,987 B1 | 11/2010 | Kirchhoff et al. | |
| 8,027,332 B1* | 9/2011 | Martin .............. | H04M 3/42263 370/352 |
| 8,686,837 B2 | 4/2014 | Larsen et al. | |
| 8,712,362 B2 | 4/2014 | Cilia | |
| 8,761,687 B2 | 6/2014 | Chang et al. | |
| 8,824,652 B2 | 9/2014 | Bennett | |
| 8,971,555 B2 | 3/2015 | Koss et al. | |
| 9,253,311 B2 | 2/2016 | Bennett | |
| 9,736,296 B2 | 8/2017 | Bennett | |
| 2001/0016037 A1* | 8/2001 | Fritzinger et al. ....... | 379/201.01 |
| 2001/0019604 A1 | 9/2001 | Joyce et al. | |
| 2001/0036821 A1 | 11/2001 | Gainsboro et al. | |
| 2002/0061100 A1* | 5/2002 | DiCamillo et al. ....... | 379/221.02 |
| 2002/0132638 A1* | 9/2002 | Plahte et al. ................. | 455/555 |
| 2002/0181460 A1* | 12/2002 | Strathmeyer et al. ........ | 370/389 |
| 2002/0198007 A1* | 12/2002 | Zimmerman ................. | 455/458 |
| 2003/0078041 A1* | 4/2003 | Dikmen et al. ............... | 455/433 |
| 2003/0161446 A1* | 8/2003 | Dammrose ......... | H04M 3/2281 379/32.01 |
| 2003/0215069 A1 | 11/2003 | Hitzeman | |
| 2004/0110465 A1* | 6/2004 | Bedingfield et al. ........ | 455/3.05 |
| 2004/0135686 A1 | 7/2004 | Parker | |
| 2004/0152442 A1 | 8/2004 | Taisto et al. | |
| 2004/0165709 A1* | 8/2004 | Pence .................. | H04M 7/126 379/201.01 |
| 2004/0208307 A1 | 10/2004 | Walker et al. | |
| 2004/0219911 A1* | 11/2004 | Kouchri ............. | H04M 3/2281 455/423 |
| 2004/0240439 A1* | 12/2004 | Castleberry ....... | H04L 29/06027 370/389 |
| 2005/0074104 A1* | 4/2005 | Swartz ..................... | 379/142.08 |
| 2005/0094773 A1* | 5/2005 | Peterson ............. | H04M 3/2281 379/35 |
| 2005/0111629 A1 | 5/2005 | Carlson et al. | |
| 2005/0175165 A1* | 8/2005 | Holder ...................... | 379/221.15 |
| 2005/0180395 A1* | 8/2005 | Moore et al. ............... | 370/352 |
| 2005/0232253 A1* | 10/2005 | Ying et al. .................... | 370/356 |
| 2005/0277407 A1 | 12/2005 | Ahn et al. | |
| 2006/0034426 A1 | 2/2006 | Freundenberger et al. | |
| 2006/0147012 A1* | 7/2006 | Moody ............ | H04M 3/42017 379/207.16 |
| 2006/0270465 A1 | 11/2006 | Lee et al. | |
| 2006/0291638 A1* | 12/2006 | Radziewicz ............ | H04M 3/02 379/211.01 |
| 2007/0019618 A1* | 1/2007 | Shaffer et al. ................ | 370/352 |
| 2007/0036127 A1 | 2/2007 | Roosen et al. | |
| 2007/0041550 A1* | 2/2007 | McLarty et al. ......... | 379/211.02 |
| 2007/0105531 A1 | 5/2007 | Schroeder | |
| 2007/0161412 A1* | 7/2007 | Nevid .................... | H04M 19/04 455/567 |
| 2007/0183403 A1* | 8/2007 | Somers ......................... | 370/352 |
| 2007/0217437 A1 | 9/2007 | Forte | |
| 2007/0286389 A1 | 12/2007 | Hyerle et al. | |
| 2008/0008105 A1 | 1/2008 | Black et al. | |
| 2008/0045186 A1 | 2/2008 | Black et al. | |
| 2008/0057929 A1 | 3/2008 | Min | |
| 2008/0182547 A1 | 7/2008 | Glover | |
| 2008/0198978 A1 | 8/2008 | Olligschlaeger | |
| 2008/0205626 A1* | 8/2008 | Mandalia et al. ....... | 379/265.09 |
| 2008/0215725 A1* | 9/2008 | Backer et al. ................. | 709/224 |
| 2008/0242271 A1* | 10/2008 | Schmidt ............ | H04M 1/72572 455/414.1 |
| 2008/0291013 A1 | 11/2008 | McCown et al. | |
| 2009/0041205 A1 | 2/2009 | Russell et al. | |
| 2009/0061872 A1* | 3/2009 | Hicks ............................ | 455/436 |
| 2009/0074156 A1* | 3/2009 | Ku et al. ........................ | 379/35 |
| 2009/0119100 A1 | 5/2009 | Akella et al. | |
| 2009/0141883 A1* | 6/2009 | Bastien .................... | H04L 63/00 379/213.01 |
| 2009/0214008 A1* | 8/2009 | Mani ................. | H04M 3/42017 379/88.23 |
| 2010/0027766 A1 | 2/2010 | Shin | |
| 2010/0099461 A1 | 4/2010 | Rahfaldt et al. | |
| 2010/0113086 A1 | 5/2010 | Chang et al. | |
| 2010/0128857 A1* | 5/2010 | Logan ....................... | 379/88.22 |
| 2010/0161683 A1* | 6/2010 | Leeds et al. ................... | 707/803 |
| 2010/0167687 A1 | 7/2010 | Morrey et al. | |
| 2010/0173605 A1 | 7/2010 | Moraes | |
| 2010/0189228 A1 | 7/2010 | Seyfetdinov | |
| 2010/0220843 A1* | 9/2010 | Bosan ................ | H04M 1/72519 379/88.22 |
| 2011/0026701 A1 | 2/2011 | Kirchhoff et al. | |
| 2011/0081009 A1 | 4/2011 | Ma et al. | |
| 2011/0164734 A1* | 7/2011 | Clark ................ | H04M 3/42017 379/67.1 |
| 2012/0149350 A1 | 6/2012 | Fan et al. | |
| 2013/0303151 A1* | 11/2013 | Johnson ................. | H04W 4/003 455/419 |
| 2014/0194101 A1* | 7/2014 | Mullen ............... | H04W 68/005 455/418 |
| 2014/0302835 A1* | 10/2014 | Henderson ............ | H04W 4/001 455/418 |

FOREIGN PATENT DOCUMENTS

| | | |
|---|---|---|
| CN | 1917456 A | 2/2007 |
| CN | 101112053 A | 1/2008 |
| CN | 201039280 Y | 3/2008 |
| EP | 1-835-691 | 9/2007 |
| GB | 2456754 | 7/2009 |
| JP | 2001-237965 | 8/2001 |
| JP | 2001-268230 | 9/2001 |
| JP | 2007166089 | 6/2007 |
| JP | 2009-071603 | 4/2009 |
| JP | 2009-260492 | 11/2009 |
| RU | 2221345 C2 | 1/2004 |
| WO | WO 2001/050682 A1 | 7/2001 |
| WO | WO 2005/031544 A2 | 4/2005 |
| WO | WO 2011/129420 | 10/2011 |
| WO | WO 2013/003779 A1 | 1/2013 |

OTHER PUBLICATIONS

Office Action for U.S. Appl. No. 13/539,050, dated May 30, 2014, 11 Pages.
1st Office Action for Mexican Patent Application No. MX 14/000151, dated Feb. 12, 2015, 5 Pages.
1st Office Action for Mexican Patent Application No. MX 13/013965, dated Feb. 20, 2015, 3 Pages.
Office Action for Mexican Patent Application No. MX 14/004373, dated Mar. 2, 2015, 3 Pages.

(56) References Cited

OTHER PUBLICATIONS

Examination Report for Canadian Patent Application No. CA-2,850,524, dated May 4, 2015, 5 Pages.
Supplementary European Search Report for European Patent Application No. EP 12805395, dated May 11, 2015, 7 Pages.
Chinese First Office Action, Chinese Application No. 201280039587.6, dated Aug. 1, 2014, 25 pages.
European Supplementary Search Report for EP Application No. 12840210.4, dated Feb. 16, 2015, 6 pages.
Russian Office Action, Russian Patent Application No. 2014102971/07(004560), dated Mar. 17, 2015, 11 Pages.
Russian Office Action, Russian Patent Application No. 2014118569/07(029296), dated Mar. 24, 2015, 12 Pages.
PCT International Search Report and Written Opinion for PCT/US2014/026240, dated Sep. 19, 2014, 12 Pages.
United States Office Action, U.S. Appl. No. 14/086,960, dated Sep. 18, 2014, 11 pages.
United States Office Action, U.S. Appl. No. 13/539,050, dated Sep. 22, 2014, 13 pages.
United States Office Action, U.S. Appl. No. 13/539,050, dated Apr. 10, 2015, 15 pages.
United States Office Action, U.S. Appl. No. 14/537,619, dated Jan. 16, 2015, 12 pages.
Second Office Action for Chinese Patent Application No. CN 201280039587.6, dated Jun. 30, 2015, 18 Pages.
Examination Report for Canadian Patent Application No. CA-2,839,952, dated Jul. 13, 2015, 4 Pages.
Patent Examination Report No. 2 for Australian Patent Application No. AU 2014236991, dated Dec. 21, 2015, 2 Pages.
Patent Examination Report No. 1 for Australian Patent Application No. AU 2014236991, dated Sep. 23, 2015, 2 Pages.
Patent Examination Report No. 1 for Australian Patent Application No. AU 2012323961, dated Sep. 30, 2015, 2 Pages.
Office Action for U.S. Appl. No. 13/539,050, dated Dec. 17, 2015, 5 Pages.
Office Action for Japanese Patent Application No. JP 2014-519176, dated Oct. 6, 2015, 9 Pages.
Office Action for Japanese Patent Application No. JP 2014-519176, dated Apr. 12, 2016, 4 Pages.
Examination Report No. 1 for Australian Patent Application No. 2012275151, dated May 2, 2016, 3 Pages.
Examination Report No. 2 for Australian Patent Application No. 2012275151, dated Jul. 27, 2016, 4 Pages.
$3^{rd}$ Office Action for Chinese Patent Application No. 2012800395876, dated Mar. 8, 2016, 9 Pages.
$1^{st}$ Office Action for Chinese Patent Application No. 201280057427.4, dated Apr. 28, 2016, 21 Pages.
Office Action for Chinese Patent Application No. CN 201280036618.2, dated Jun. 3, 2016, 17 Pages.
Office Action for U.S. Appl. No. 13/539,050, dated Jun. 30, 2016, 12 Pages.
Office Action for Mexican Patent Application No. MX 15/013841, dated Mar. 8, 2016, 3 Pages.
Office Action for Canadian Patent Application No. CA 2,839,952, dated Sep. 12, 2016, 3 Pages.
Extended Search Report for European Patent Application No. EP 14769627.2, dated Nov. 4, 2016, 5 Pages.
Office Action for Japanese Patent Application No. JP 2014-535957, dated Oct. 4, 2016, 6 Pages.
Office Action for Chinese Patent Application No. CN 201280036618.2, dated Dec. 5, 2016, 19 Pages.
Office Action for U.S. Appl. No. 15/650,727, dated Nov. 16, 2017, 8 Pages.
Communication pursuant to Article 94(3) EPC for European Patent Application No. EP 14769627.2, dated Aug. 31, 2017, 5 Pages.
Rosenberg J., et al., "Best Current Practices for Third Party Call Control (3pcc) in the Session Initiation Protocol (SIP)," RFC 3725, Network Working Group, Apr. 2004, pp. 1-31.
Office Action for Mexican Patent Application No. MX 15/012023, dated Feb. 9, 2017, 4 Pages.
$2^{nd}$ Office Action for Chinese Patent Application No. CN 201280057427.4, dated Feb. 27, 2017, 17 Pages.
$3^{rd}$ Office Action for Chinese Patent Application No. CN 201280057427.4, dated Aug. 11, 2017, 8 Pages.
Office Action for Chinese Patent Application No. CN 201280036618.2, dated Jun. 14, 2017, 24 Pages.
Wu, X., et al. Analysis of the Principles of Spy Software and Study on Carriers' Handling Policy, published on Mar. 15, 2011, Mobile Communications, pp. 67-72 (With English Abstract).

* cited by examiner

Map Virtual Number 350

| Mapping Table 360A ||
|---|---|
| Transmitting Number 361A | MA Numbers 363A |
| 555-111-2222 ↔ | 555-999-8888 |
| 555-111-2222 ↔ | 555-999-7777 |

FIG. 3B

Map Virtual Number 350

| Mapping Table 360B |||
|---|---|---|
| Transmitting Number 361B | MA Numbers 363B | Local Numbers 365 |
| 555-111-2222 ↔ | +44 555-333-2222 ↔ | 555-999-8888 |
| 555-111-2222 ↔ | +44 555-333-4444 ↔ | 555-999-7777 |

FIG. 3C

Map Virtual Number 350

| Mapping Table 360C ||
|---|---|
| MA Number 363C | Monitoring Numbers 367 |
| 555-999-8888 ↔ | 555-999-6666 |
| 555-999-8888 ↔ | 555-999-5555 |

FIG. 3D

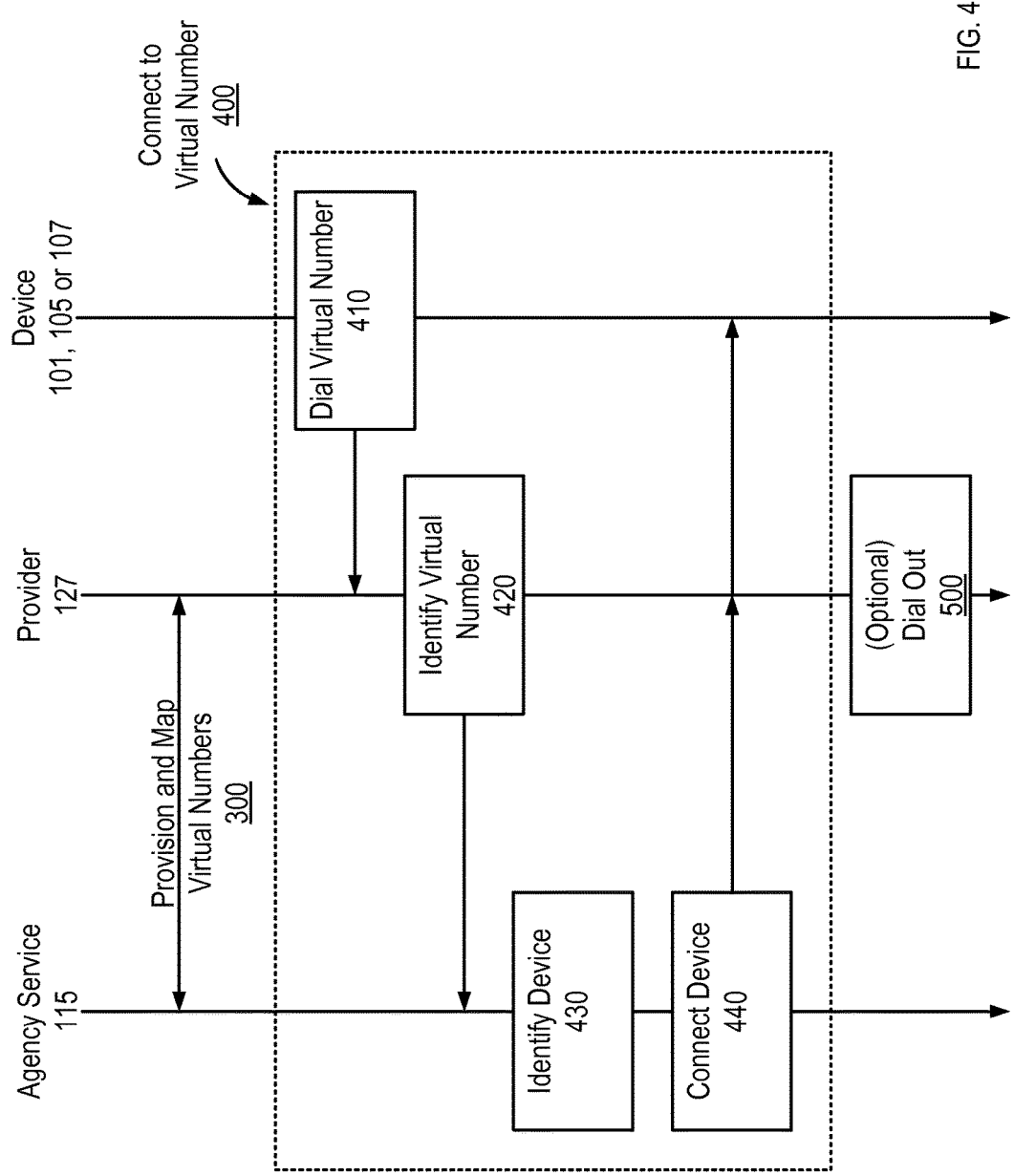

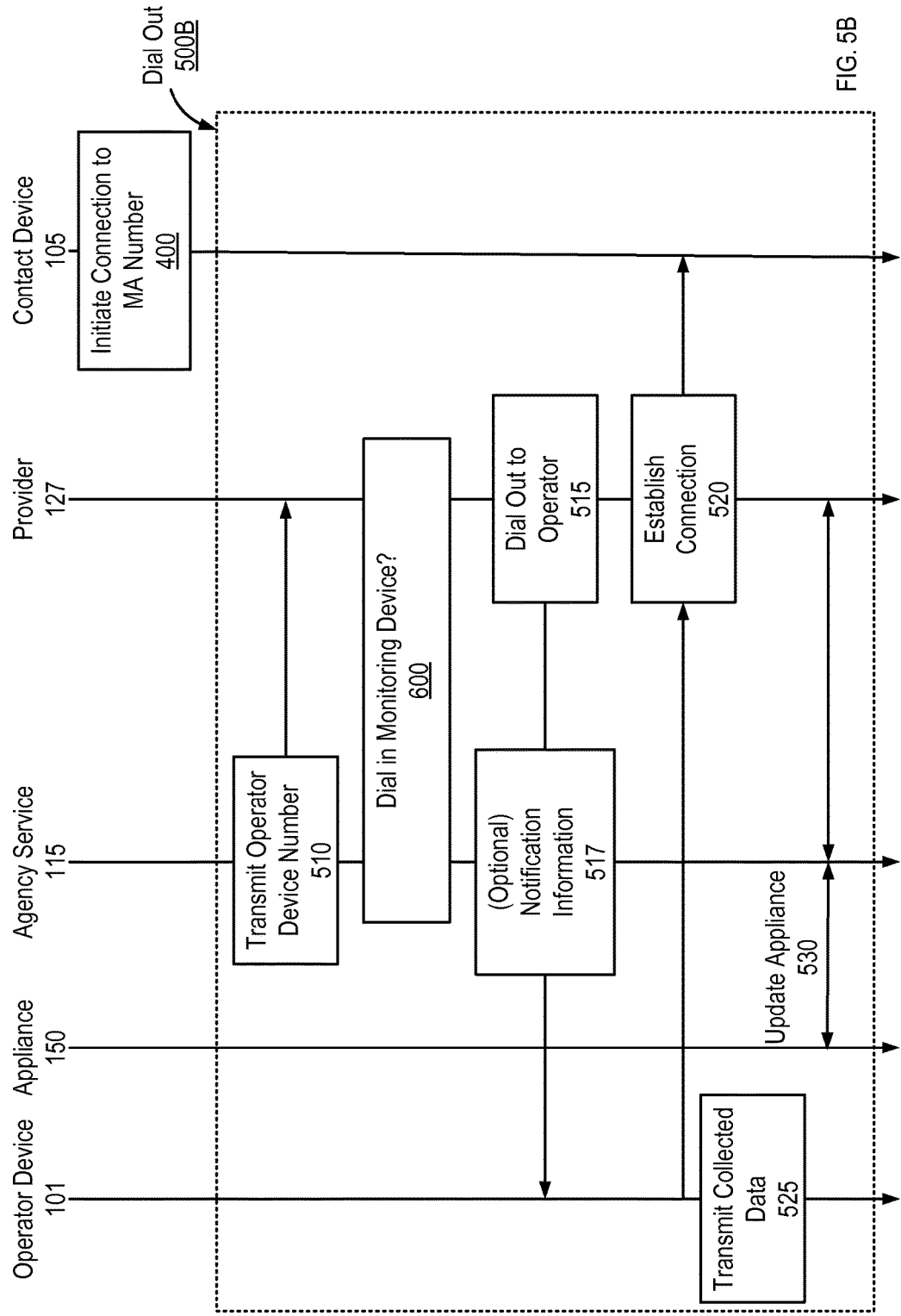

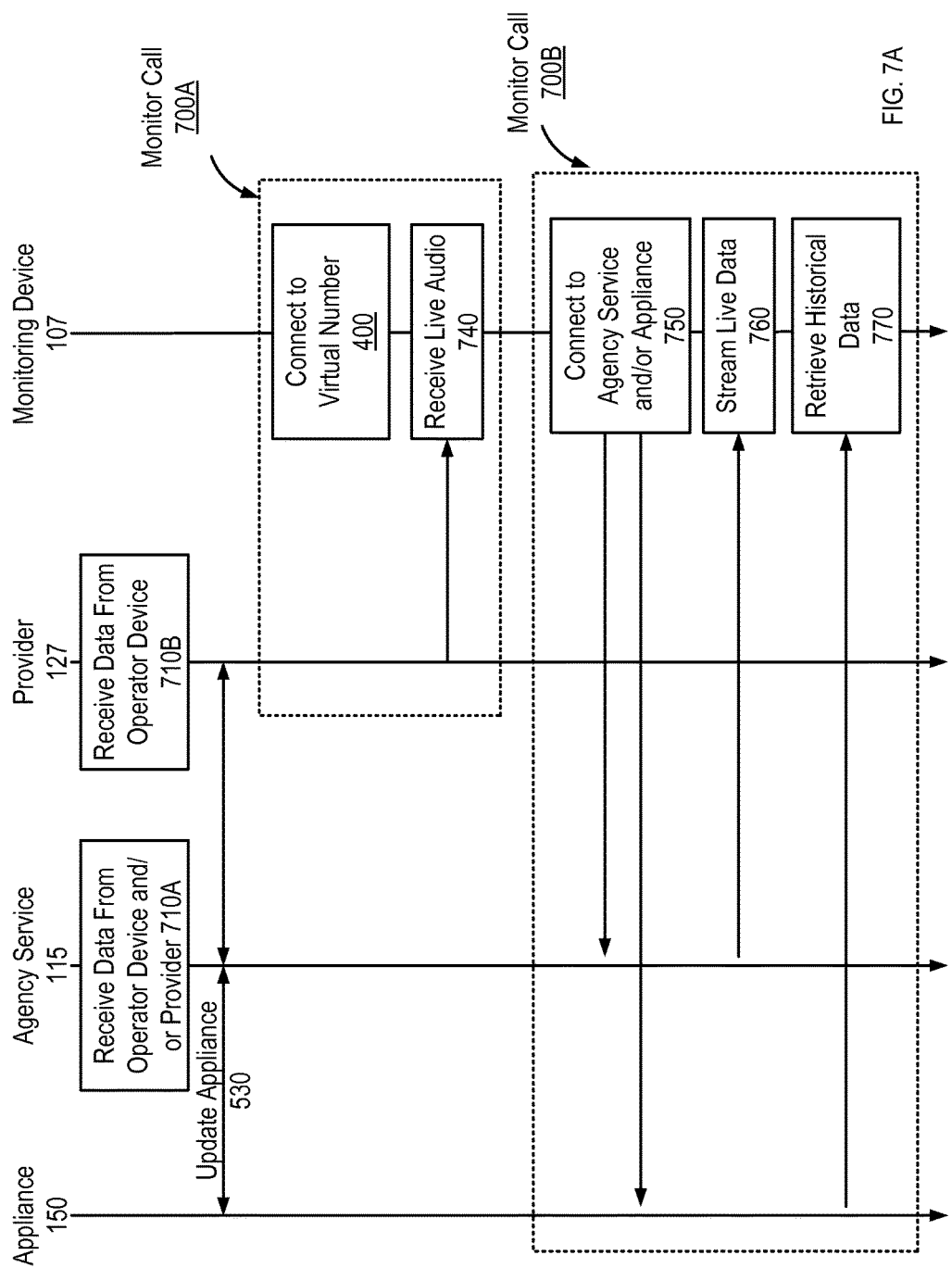

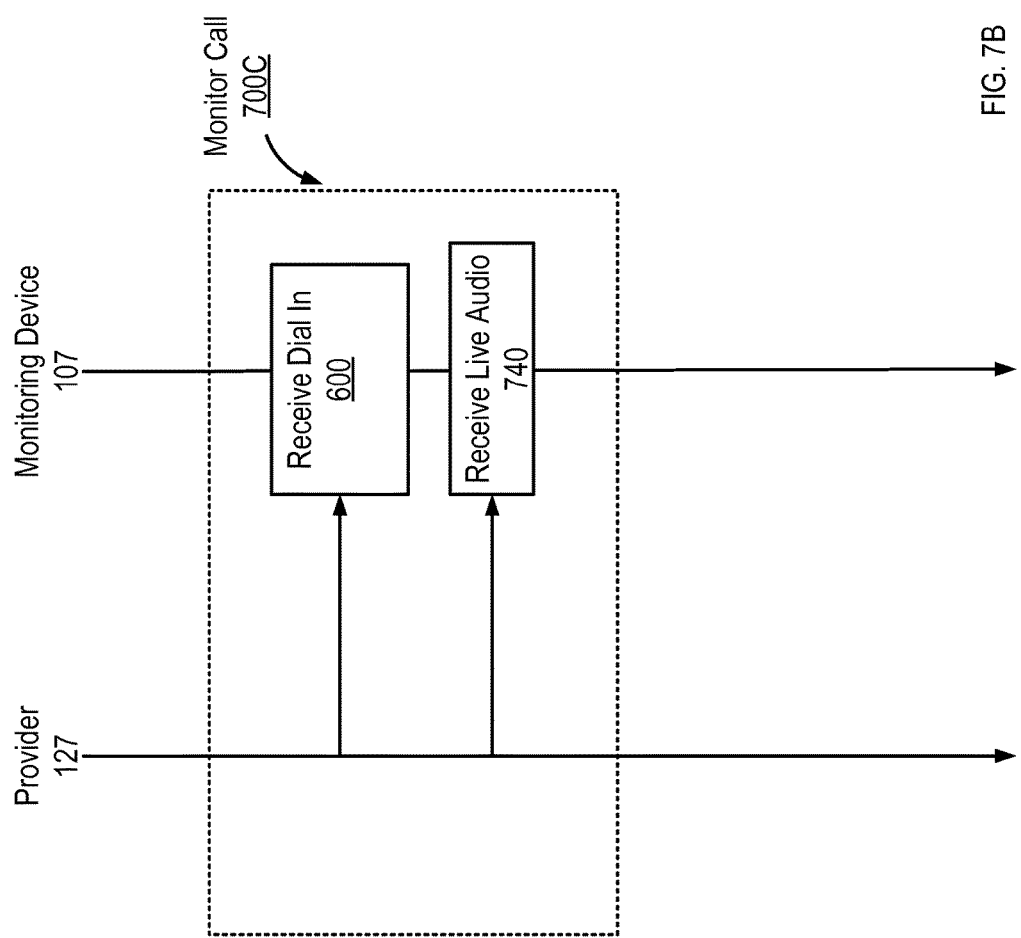

ATTACHING MULTIPLE PHONE LINES TO A SINGLE MOBILE OR LANDLINE PHONE

CROSS REFERENCE TO RELATED APPLICATIONS

This application is a continuation in part of U.S. application Ser. No. 13/539,050, filed Jun. 29, 2012, which claims the benefit of U.S. Provisional Application 61/503,586, filed Jun. 30, 2011, both of which are incorporated by reference herein in their entirety.

BACKGROUND

1. Field of Art

The present disclosure generally relates to the field of undercover operations and more specifically to managing multiple identities using a single phone.

2. Background of the Invention

Police officers and other agents "operators" oftentimes conduct multiple investigations at the same time during the course of their duties. In many cases, these investigations require the operator to use phones to call, send short message service "SMS" messages (including multimedia messaging service "MMS" messages and proprietary messaging services such as BLACKBERRY messages "BBM"), or otherwise communicate with various contacts under a fake identity. Oftentimes, criminals and other individuals can ascertain information about the operator or the device used by the operator from data associated with the communication. Accordingly, operators frequently use multiple telephonic devices to manage different contacts and protect their identity.

Many operators are issued multiple mobile phones by their agency or department for use with different contacts and for different investigations. For example, the operator may require different phones having different numbers when communicating with different contacts in order to maintain a specific identity or conceal their true identity. Traditionally, the operator would physically require multiple phones or multiple subscriber identity modules (SIM cards) to maintain these different identities.

Use of multiple physical phones present difficulties for the operator in that the operator must carry the correct phone and/or multiple phones at the right time to receive a call or otherwise use the device. Multiple SIM cards are similarly intrusive in that, while they contain all the information required for a given identity, the operator would not receive notifications of calls, etc., incoming to a SIM card unless it was active in a device. Hence, the operator would still require multiple phones to monitor activity on multiple SIM cards. Furthermore, agencies oftentimes lack the ability to issue operators the appropriate devices, SIMs and/or corresponding identities in real time. While these difficulties are discussed with respect to an operator, private individuals (e.g., a business owner) and other entities face similar difficulties when operating multiple devices.

SUMMARY

The above and other issues are address by a method and computer system for configuring one or more virtual numbers for use on a network and attaching the virtual numbers to the operator device. An embodiment of the method comprises receiving connection information in response to requests, such as a phone call or a message, from a telephonic device to communicate with a virtual number. The connection information includes device information about the telephonic device and the virtual number. Based on the connection information, the telephonic device is identified as a contact device or operator device from a mapping table that stores device information associated with virtual number information.

If the mapping table identifies the telephonic device requesting to connect to the virtual number as an operator device, the method further comprises receiving device information corresponding to a contact device the operator would like to communicate with and transmitting instructions for at least one of connecting the operator device with the contact device through the virtual number or transmitting data received from the operator device to the contact device from the virtual number.

If the mapping table identifies the telephonic device requesting to connect to the virtual number as a contact device, the method further comprises transmitting instructions for establishing a connection between the contact device and the operator device. As the contact device and the operator device communicate using the virtual number, contacts are prevented from ascertaining device and/or number information associated with the operator device.

The method may further comprise receiving number information for configuring the virtual number to playback a specified ring tone when the telephonic device requests to communicate with the virtual number. If the mapping table identifies the telephonic device requesting to connect to the virtual number as a contact device, the method further comprises continuing to play the specified ring tone for the contact device until the connection between the contact device and the operator device is established. The specified ring tone spoofs the physical location of the operator device.

The method may further comprise identifying a monitoring device associated with the virtual number based on the mapping table. In response to identifying the monitoring device, the method further comprises transmitting instructions for establishing a second connection with the monitoring device, the second connection configured to provide the monitoring device with audio communications between the contact device and the operator device. The second connection may also be configured to prevent the contact device and the monitoring device from receiving audio from the monitoring device for the duration of the second connection.

An embodiment of the system comprises a service having one or more processors and a non-transitory computer-readable storage medium storing computer program code. When executed, the computer program code causes the server to receive information in response to requests, such as a phone call or a message, from a telephonic device to communicate with a virtual number. The information received includes device information about the telephonic device and the virtual number. Based on the connection information, the server identifies the telephonic device as a contact device or operator device in response to matching received information with device information associated with virtual number information stored in a mapping table.

If the mapping table identifies the telephonic device requesting to connect to the virtual number as an operator device, the server receives device information corresponding to a contact device the operator would like to communicate with and, in turn, transmits instructions for at least one of connecting the operator device with the contact device through the virtual number or transmitting data received from the operator device to the contact device from the virtual number.

If the mapping table identifies the telephonic device requesting to connect to the virtual number as a contact device, the server transmits instructions for establishing a connection between the contact device and the operator device. As the contact device and the operator device communicate through the virtual number, contacts are prevented from ascertaining device and/or number information associated with the operator device.

The server may further receive number information for configuring the virtual number to playback a specified ring tone when the telephonic device requests to communicate with the virtual number. If the mapping table identifies the telephonic device requesting to connect to the virtual number as a contact device, the system may further transmit instructions for continuing to play the specified ring tone for the contact device until the connection between the contact device and the operator device is established. The specified ring tone spoofs the physical location of the operator device.

The server may further identify a monitoring device associated with the virtual number based on the mapping table. In response to identifying the monitoring device, the server may further transmit instructions for establishing a second connection with the monitoring device, the second connection configured to provide the monitoring device with audio communications between the contact device and the operator device. The second connection may also be configured to prevent the contact device and the monitoring device from receiving audio from the monitoring device for the duration of the second connection.

Additionally, multiple virtual numbers may be attached, or associated with, a single operator device to allow an operator to manage a variety of contacts. In turn, embodiments may further comprise receiving a selection of which virtual number to use for communicating with a specified contact device without compromising operator identity.

BRIEF DESCRIPTION OF THE DRAWINGS

The teachings of the embodiments can be readily understood by considering the following detailed description in conjunction with the accompanying drawings.

FIGS. 3B and 3C are tables illustrating example embodiments of virtual number mapping for operating and monitoring MA numbers.

FIG. 3D is a table illustrating an example embodiment of virtual number mapping for automatically notifying a monitoring device.

FIG. 4 is an interaction diagram illustrating a method for connecting an operator device and contact device using a virtual number according to one example embodiment.

FIG. 5B is an interaction diagram illustrating a method for dialing out to an operator device using a MA number, according to one example embodiment.

FIGS. 7A and 7B are example interaction diagrams illustrating methods for monitoring 700 an operator device 101 according to an embodiment.

DETAILED DESCRIPTION

Figure 1A:
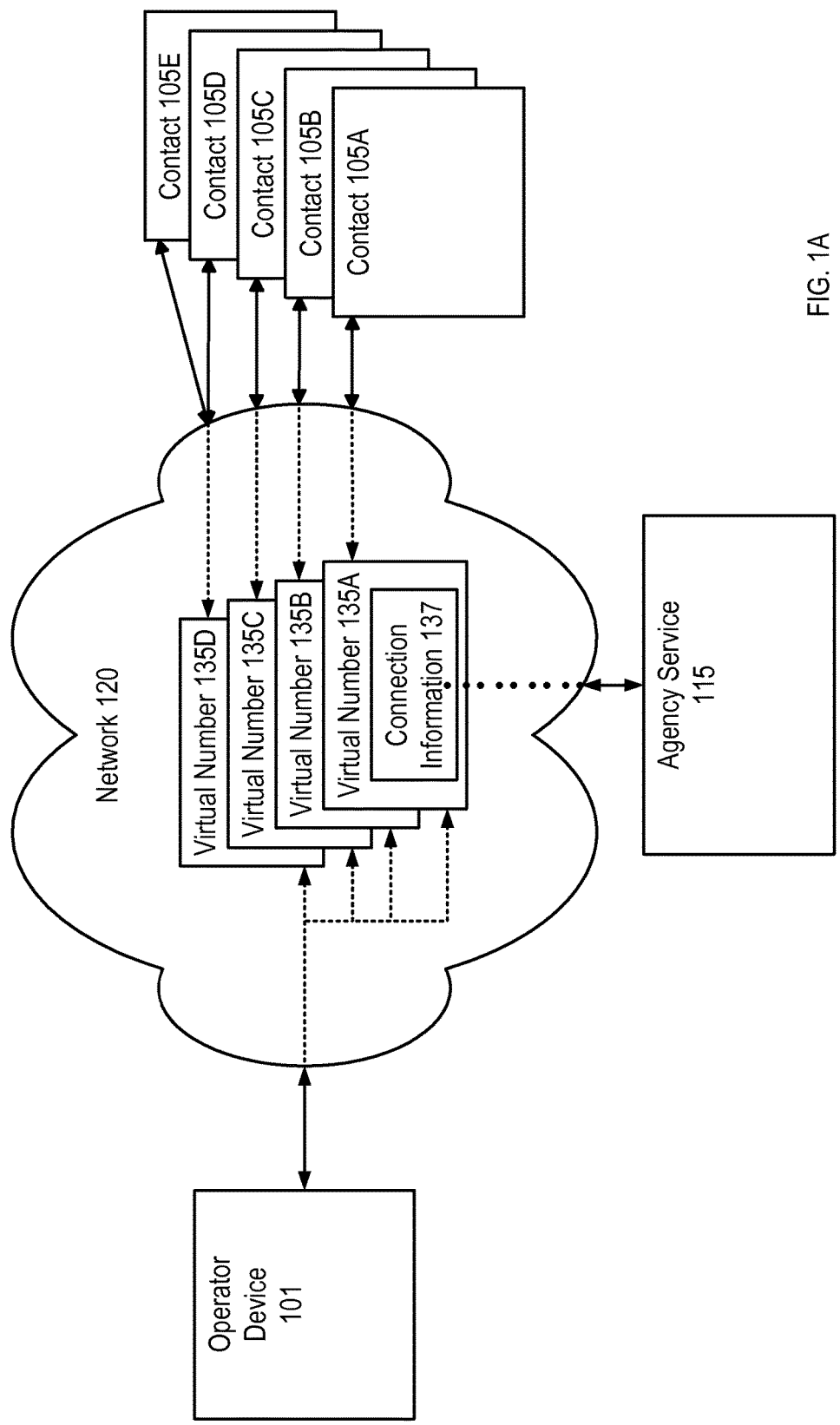
FIG. 1A is a block diagram illustrating an environment for implementing a multiple attached number "MA number" system according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Many operators posses a personal mobile phone or are issued a mobile phone by their agency or department. Oftentimes, operators work multiple cases and the traditional procedure of issuing/carrying additional devices or SIMs is not feasible under the given circumstances or simply cumbersome to the operator or agency. Furthermore, the traditional procedure requires the operator to manually mange the collection of devices, SIMs and their associated identities. In high pressure situations, the operator may inadvertently compromise an identity or lack the appropriately configured device. Accordingly, the agency may coordinate with an agency support service for configuring the operator's mobile phone or landline phone to fulfill the role of multiple telephonic devices. The configuration can take place over-the-air such that a given phone is conveniently converted as needed. Additionally, if the agency desires to provide the capabilities of multiple telephonic devices to additional operators, the agency can specify additional phones for configuration.

Example embodiments described herein relate to implementing a multiple attached "MA" number system over a wired and wireless radio network (e.g., PSTN, Cellular Network and/or WiFi) for network capable devices, such as a mobile phone, or a land-line phone for use with multiple attached numbers "MA numbers". As mobile phones and similar devices are commonly carried by operators during the course of undercover investigations, mobile phones offer an existing platform for transmitting data wirelessly. Use of such a device with MA numbers allows operators to utilize a single operator device, but maintain numerous, distinct telephonic identities for communicating with various contacts. Operators working from a fixed location with a land-line phone are also provided similar capabilities for using MA numbers.

Additionally, with the popularity of smart phones and feature phones, additional monitoring and safety features may be integrated into the operator's device for enhancing operational viability in the field. For example, the operator device may be configured to collect a wide range of valuable real-time data. Real-time data collected by the operator device may include audio and Global Positioning System ("GPS") coordinates, etc.

The operator device may subsequently transmit all or a portion of the collected real-time data over existing channels (e.g., a network) back to the agency, agency service or another entity, such as those monitoring the operator's activities using a MA number. For example, embodiments of the agency, agency service and/or other entities within the MA number system receive the collected data for storage and/or live streaming to monitoring devices, operator devices and records. Depending on the embodiment, the monitoring devices are further configured to access and present (e.g., play and/or display) a variety of the real-time and historical data stored on or streamed by the entities on the network. For example, the monitoring devices may access a web interface, API or execute a standalone application for viewing operator device and MA number details and collected information. In some embodiments, the monitoring devices may access portions of the real-time data via a provided monitoring line associated with the MA number and configured for maintaining the operator's cover. The monitoring line may be used to provide call audio to monitoring devices. Alternatively, the mentoring device may be connected to the MA number, but with outbound audio communications from the monitoring device disabled. Thus, the monitor may be provided with call audio while the operator's cover is maintained. Furthermore, other agencies with appropriate credentials and monitoring devices may similarly access portions of the collected information during inter-agency investigations.

Environment and Implementation of the Operator Device System

FIG. 1A is a block diagram illustrating an environment 100 for implementing a multiple attached number system according to one example embodiment. As shown the environment 100 includes a network 120 connecting an agency support service provider "agency service" 115, an operator device 101 and contact devices 105A through 105E. While only one agency service 115 and one operator device 101 are shown in FIG. 1A for clarity, embodiments can support many operator devices 101 and have multiple agency service providers 115.

Agency service 115 represents a collection of compute devices (e.g., servers) and related storage mediums that are configured for performing various activities such as configuring operator devices 101, exchanging data over the network 120 and storing data in support of one or more agencies (not shown) and operated operator devices 101. For example, the agency service 115 may include one or more modules providing ascribed functionality to an agency via an application programming interface ("API") or web interface, collectively "the interface", as described in more detail with reference to FIG. 1B. The agency service 115 may also include infrastructure for providing audio and video communicability (e.g., internally and/or over the network 120) within the monitoring interface using the public switched telephone network ("PSTN"), voice over internet protocol ("VoIP") and video conferencing services.

The operator devices 101 are oftentimes mobile telephonic devices capable of collecting data and transmitting data (e.g., wirelessly) over the network 120. Some examples of an operator device 101 include a mobile phone, tablet or notebook computer. Example embodiments of the operator device 101 as a mobile phone include feature phones, smart phones or standard mobile phones. Accordingly, a given mobile phone or other device operated as an operator device 101 may not necessarily include or support all of the functionality ascribed herein to the operator device or MA number system due to inherent differences in device capabilities. In some embodiments, other telephonic devices such as land-line phones are used with the MA number system.

In one embodiment, the operator device 101 executes a MA module for automating connections through the network 120 and collecting and transmitting data to entities on the network 120. An example embodiment of a MA module is described in more detail with reference to FIG. 2.

In addition to the operator devices 101, a number of monitoring devices (not shown) may connect to entities on the network 120 to obtain or present data associated with one or more of the operator devices. Depending on the embodiment, a monitoring device is a network 120 capable device that can be operated within an agency or externally in the field. As referred to herein, a monitoring device is a mobile or stationary device capable of connectivity (e.g., wireless or wired) to a network 120 such as an agency network, the internet, PSTN and/or cellular network. Some examples of a monitoring device include a mobile phone, land-line phone, tablet and notebook or desktop computer.

Example embodiments of the monitoring device as a mobile phone can include feature phones, smart phones or standard mobile phones. Accordingly, a given mobile phone or other device operated as a monitoring device does not necessarily include or support all of the functionality ascribed herein to the monitoring device or the MA number system due to inherent differences in device capabilities. In one example embodiment, the monitoring device executes a monitoring module for interfacing with entities on the network 120 to manage operator devices 101 and view collected data.

Also shown are a number of contact devices 105 associated with contacts the operator desires to communicate with using a desired identity. Embodiments of the various contact devices 105 include any network 120 capable device that may send or receive information associated with a transmitting number on the network 120 (however, in some instances, the contact device 105 may use a virtual number itself, or other means, to do so). Accordingly, as referred to herein, a contact device 105 is a mobile or stationary device capable of connectivity (e.g., wireless or wired) to the network 120 for sending or receiving information over the internet, PSTN and/or cellular network. Some examples of a contact device 105 include a mobile phone, land-line phone, tablet and notebook or desktop computer.

FIG. 1A also illustrates a number of virtual numbers 135A through 135D configured for use on the network 120. In one embodiment, the agency service 115 provisions and configures the virtual numbers 135 and handles number information to establish identities for the virtual numbers on the network 120. Additionally, the agency service 115 receives connection information 137 describing operator devices 101 and contact devices 105 requesting to communicate with handled virtual numbers 135. For example, an operator device 101 or contact device 105 may request (and attempt) to communicate with a virtual number (e.g., 135A) by way of a connection request or otherwise transmitting data to the virtual number. Common examples of communication requests include placing a call to and/or messaging the virtual number from a given device. Based on the device information and configuration of the virtual number, the agency service 115 identifies devices requesting to communicate with a virtual number as either the operator device 101 associated with the virtual number or a contact device 105 (and, in some cases, a monitoring device). For example, the agency service 115 may maintain a mapping table storing transmitting numbers and authentication information for a given operator device 101 and attached virtual numbers 135 for identifying the operator device based on the connection information 127.

When the operator device 101 requests to communicate with the virtual number 135A, the agency service 115 identifies the transmitting number of the device as that of the operator device 101 using the mapping table. After identifying the operator device 101, the agency service 115 enables the operator device 101 to specify a given contact 105A the operator would like to communicate with and, in turn, enables the operator device 101 to communicate with the contact device 105A through (e.g., establishing a connection with or transmitting data from) the virtual number. For example, the operator device 101 specifies device information, such as a transmitting number, for the contact device 105A. The agency service 115 receives the device information for the contact device 105A and transmits instructions that cause the contact device to receive a call from virtual number 135A. If the contact device 105A answers, the parties are connected.

In another example, the operator device 101 may transmit data such as an SMS message to the virtual number 135A and specify a contact device 105A for receiving the SMS message from the virtual number 135A. In other words, the agency service 115 transmits instructions (e.g., to a provider) to dial out to the contact device 105A from the virtual number 135A to connect the operator device 101 with the contact device 105 or to send an SMS message from the virtual number to transmit data received from the operator device 101 to intended the contact. As the agency service 115 connects the operator device 101 with entities on the network 120 through the virtual number, the virtual numbers 135 prevent other entities, such as contacts 105, from viewing device and/or number information associated with the operator device.

When the contact device 105A requests to communicate with the virtual number 135A, the agency service 115 determines that the transmitting number of the device is not that of the operator device 101 using the mapping table. Thus, the agency service 115 identifies the contact device 105A as attempting to communicate with the operator using the virtual number. The agency service 115 determines the operator device (e.g., operator device 101) associated with the virtual number 135A and in turn, enables the operator device 101 to receive communications from the contact device 105A through the virtual number 135A. For example, the agency service 115 may transmit instructions for connecting the contact device 105 with the operator device 101 (e.g., by dialing out to the operator device 101, optionally from the virtual number) or transmitting data such as SMS messages received at the virtual number from the contact device to the operator device from the virtual number or directly from the agency service 115. As the contact devices 105 send and receive communications to/from the operator device 101 through the virtual number, contacts are typically unable to ascertain device and/or number information associated with the operator device.

The operator device 105, on the other hand, may receive the connection information 137 from the agency service 115 or other entity about contact devices 105 dialing a virtual number 135 and the number identity of the dialed virtual number. Accordingly, the operator may make an informed decision about the caller and the identity expected from the operator. The agency service 115 may further enable the operator or agency to configure multiple virtual numbers to attach to, or associated with, a single operator device 101 for managing a variety of contacts 105. In turn, the operator may use the single operator device 101 to select which virtual number (e.g., 135A) to use for connecting to a specified contact device 105A over the network 120 without compromising operator identity.

As described above, the agency service 115 provisions and configures virtual numbers 135 and handles number information to establish identities for the virtual numbers on the network 120. In some embodiments, the agency service 115 may additionally specify one or more monitoring devices (not shown) to notify when the operator device 101 or contact device 105 utilizes a virtual number 135A for communications. For example, the agency service 115 may maintain a mapping table storing transmitting numbers and authentication information for monitoring devices in associated with the virtual number 135A. When the agency service 115 identifies an operator device 101 requesting to communicate using the virtual number 135A or a contact device 105 attempting to connect to the virtual number 135A, the agency service 115 connects the parties while additionally notifying the monitoring device. The notifications themselves may come in different forms and are explained in more detail below.

In the case telephonic communications between the contact device 105 and the operator device 101, the agency service 115 identifies instances when the operator device 101 and the contact device 105 attempt to establish telephonic communications through the virtual number 135A. In turn, the agency service 115 may transmit instructions (e.g., to a provider) to dial out to the monitoring device and connect the monitoring device with the virtual number 135A. When connected to the virtual number 135, the monitoring device receives the audio data corresponding to communication between the contact device 105 and operator device 101 through the virtual number 135. In order to prevent contact suspicion as to the operator's identity, audio transmissions from the monitoring device to the virtual number and any audio associated with establishing the connecting between the monitoring device and the virtual number is disabled.

In the case of SMS communications between the operator device 101 and contact device 105, the agency service 115 identifies the sender, intended recipient and the virtual number 135A used. In turn, the agency service 115 may transmit instructions to append the SMS message with the identity of the sender, recipient and/or virtual number. The SMS messages may then be forwarded to monitoring devices associated with the virtual number (e.g., in the mapping table) and capable of receiving SMS messages. The virtual number 135A used may be omitted from the SMS message when the virtual number 135A is utilized to transmit the SMS message to the monitor device. Alternatively, the agency service 115 may retrieve the SMS message (e.g., from a provider or the operator device) and provide the messages to the monitoring device in another fashion, such as via email or an online interface.

The network 120 represents the communication pathway between agencies, agency service 115, the operator devices 101, contact devices 105, monitoring devices and other entities (not shown). In one embodiment, the network 120 includes standard communications technologies and/or protocols and can include the Internet and PSTN. Oftentimes, these communications technologies and/or protocols carry both PSTN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

As used herein, the terms "message," "messaging," and "short messaging service (SMS)" each comprise the breadth of messaging services and related technologies or standards used for communicating and transmitting data over the network 120. These technologies and services include SMS messages, multimedia messaging service "MMS" messages, proprietary messaging service messages such as BLACKBERRY messages "BBM" and the like.

Figure 1B:
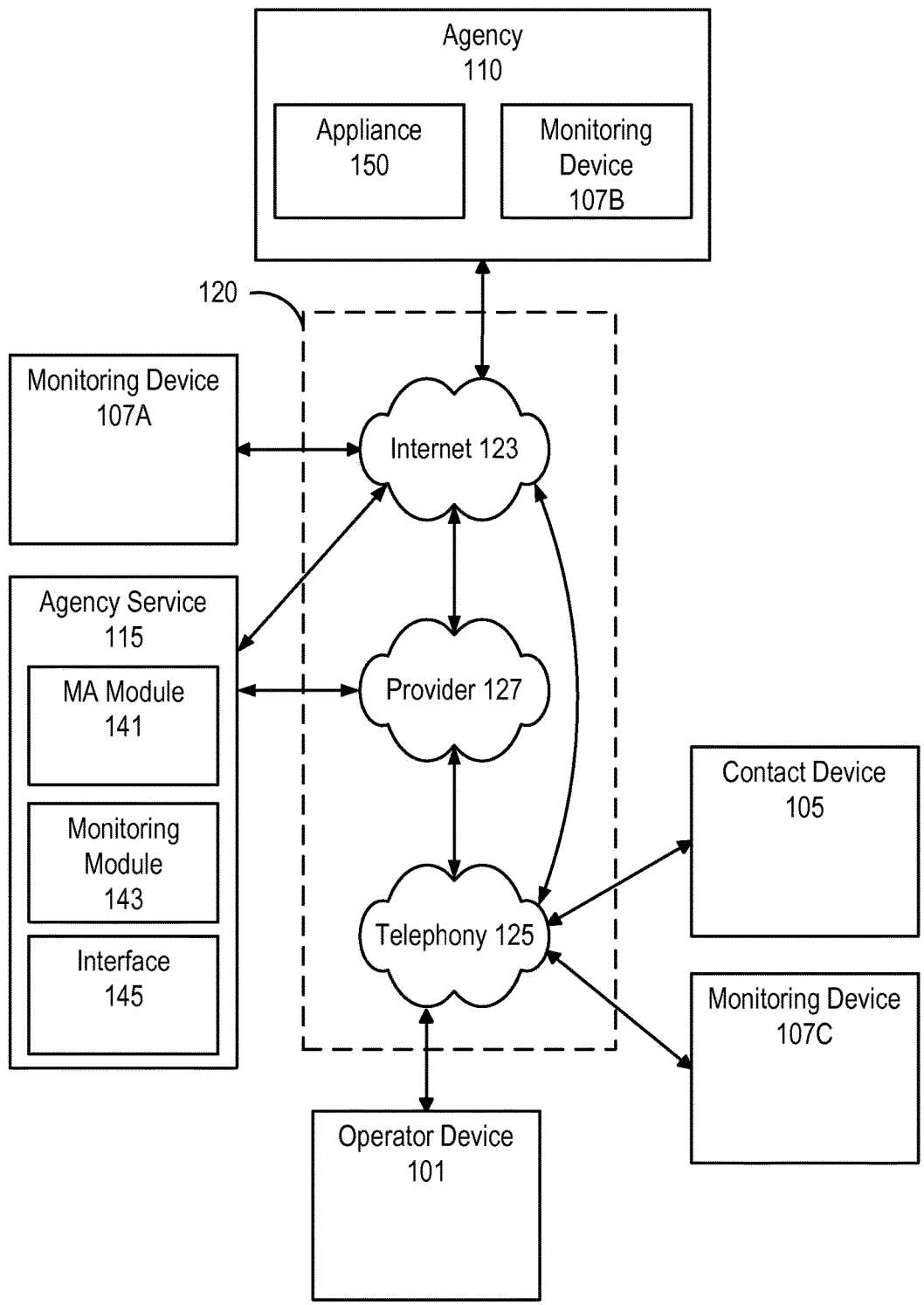
FIG. 1B is a block diagram illustrating an operating environment of an agency service providing MA numbers according to one example embodiment.

FIG. 1B is a block diagram illustrating an operating environment of an agency service 115 providing MA numbers according to one example embodiment. As shown, the operating environment includes an agency 110, monitoring devices 107, operator devices 101, contacts 105 and a network 120 with components such as the internet 123, telephony 125 and provider 127. The network 120 may also include GPS satellites (not shown) that relay position data to operator devices 101 and other devices.

Agency 110 represents a collection of servers, desktop, notebook or tablet computers, mobile telephones and related storage mediums used by respective agency personnel for executing applications or modules to communicate with and receive data from the agency service 115 (e.g., via the interface 145) and other entities on the network 120. For example, agency 110 devices may execute a web browser to access a web interface or execute a mobile or desktop application for communicating with an API provided by the agency service 115. An agency 110 may also include telephonic and video infrastructure enabling audio and video communicability (e.g., internally and/or over the network 120) using the public switched telephone network ("PTSN"), voice over internet protocol ("VoIP") and video conferencing services for monitoring or specifying configurations for using operator devices 101 with virtual numbers 135.

The telephony network 125 may include servers, switches and other hardware and software for implementing, among other protocols and technologies, worldwide interoperability for PSTN communications including land-lines and 2G/3G/4G wireless protocols. The telephony network 125 also provides mobile devices with the capability to transmit and receive data over the internet 123. The telephony network 125 is managed by one or more communication service providers "CSPs" (not shown) that own telephone numbers for use on the PSTN and the CSPs own network (e.g., a wireless network that communicates with the PSTN).

The provider 127 may include servers, switches and other hardware and software for communicating over the network 120 with CSPs and other entities. The provider 127 buys or leases numbers for use on the telephony network 125 from multiple CSPs. The provider 127, in turn, manages numbers provisioned for use by the agency service 115 and the telephony traffic associated with the numbers. In one embodiment, the provider 127 allows the agency service 115 to provision one or more of the numbers as virtual numbers over the network 120.

Typically, a number used on the telephony 125 network directs to a given mobile device, VoIP device or land-line device having an associated number identity characterized by automatic number identification "ANI" information, or caller identification. Virtual numbers, while still operable with the PSTN and CSP networks, are associated with the provider 127 who handles telephony traffic for the number. Because a virtual number does not direct to an end user device, the provider 127 may establish connections with devices dialing the virtual number, record call information such as call audio and caller history (e.g., on a computer readable medium) and stream/provide call information for download (e.g., over the network 120).

The provider 127 may also pass/bridge audio (bidirectional or unidirectional) in real-time between two or more telephonic devices establishing connections with the same or different virtual numbers (or connected by the provider 127 via a virtual number). Additionally, as the virtual numbers are handled by the provider 127, the agency service 115 may modify ANI information and caller identification associated with the virtual number.

In addition to provisioning virtual numbers for the agency service 115, the provider 127 communicates notifications and data associated with the virtual numbers to the agency service 115 or other entity such as the agency 110. For example, the provider 127 may notify the agency service 115 (and optionally an operator device 101 or monitoring device 107) of an incoming caller or message to the virtual number and receive instructions from the agency service 115 to connect the caller to the virtual number (or another device) or redirect the message. In a specific example, the agency service 115 may provide instructions for the provider 125 to notify a monitoring device (e.g., 107C) in response to use of the virtual number. The provider 125, in turn, may dial out the monitoring device 107C via the virtual number (or other virtual number) and pass (or bridge) audio such that the monitoring device 107C receives the audio transmissions between the operator device 101 and contact device 105 on the virtual number. The provider 127 may also receive instructions to stop/start recordings of calls placed to the virtual number and interface with a transcription service to transcribe call audio. In turn, the provider 127 can transmit the recordings and transcripts to the agency service 115 or other entity on the network 120.

Additionally, the provider 127 may enable or disable inbound and/or outbound audio for different parties such as a monitoring device 107C connected or connecting to a virtual number and recordings thereof responsive to instructions received (e.g., via an API) from the agency service 115. The provider 127 can receive instructions for managing a virtual number and notifications as part of the provisioning process, prior to an incoming call or in real-time from the agency service 115 when connecting an incoming caller to the virtual number. In some embodiments, the provider 127 communicates directly with the agency 110, operating device 101 and/or monitoring device 107 to provision virtual numbers, transmit notifications and data or receive instructions. Additionally, the provider 127 itself may function as a CSP and vice versa.

The agency service 115 receives requests for provisioning and mapping virtual number from the agency 110, operator device 101, or monitoring device 107. The requests can include number information for provisioning virtual numbers such as an area code (e.g., 555), country code (e.g., +44) and/or associated CSP. In turn, the agency service 115 queries the provider 127 for available virtual numbers matching the request and returns the matching virtual numbers to the requesting entity. The agency service 115 subsequently receives a selection of virtual numbers from the requesting entity and claims the virtual numbers from the provider 127.

When provisioning a virtual number, the agency service 115 may optionally allow the entity to specify number information such as ANI and/or caller identification associated with the virtual number to spoof the number's identity on the network 120. The agency service 115, in turn, transmits instructions to the provider 127 for modifying the number identity. The agency service 115 may optionally verify the spoofed number identity. When a virtual number is no longer needed by the agency 110A, the agency service 115 obtains any audio recordings or call logs associated with the virtual number and releases the number back to the provider 127.

Additionally, the agency service 115 may optionally allow the entity to specify number information such as a ring tone for provisioned virtual numbers. The specified ring tone may be used to spoof the location where the number is being used on the network 120 or mimic a custom ringtone. Specifically, as ring tones can differ between countries, and for a host of other reasons, the agency service 115 may enable the entity to configure the virtual number with the provider 127 such that a specified ring tone is played when parties (e.g., a contact and operator) communicate using the virtual number. In a real world example, if the virtual number is based in the United Kingdom and the contact expects the operator using the virtual number to be in the United States, the contact may hear (incorrectly) the ring tone for the United Kingdom when dialing the virtual number (rather than the expected United States ring tone). Accordingly, the agency service 115 may provide the entity with a list of ring tones (e.g., for different countries) and/or enable the entity to upload a desired ring tone for playback to those dialing the virtual number. The agency service 115, in turn, transmits instructions to the provider 127 for configuring the virtual number with the desired ring tone for playback. Thus, the cover of the operator may be maintained when the contact dials the virtual number.

The requests can also include mapping information for configuring claimed virtual number function in a mapping table. Depending on the desired configuration, the mapping information may include the transmitting number of an operator device 101 and/or and monitoring device 107, virtual number for association with the device and/or desired function of the virtual number (e.g., MA number or local number). One example mapping request may specify a claimed virtual number for use as a virtual multiple attached number (MA number) that operator devices 101 connect to in order to transmit collected data (e.g., audio) over the telephony 125 network from the MA number's identity (e.g., to contact devices 105). In one embodiment, the request includes the transmitting number of the operator device 101 and a given claimed virtual number for configuration as the MA number. In response to the request, the agency service 115 associates the transmitting number of the operator device 101 with the MA number and stores the association in a mapping table.

Another example mapping request may specify a claimed virtual number for use as a virtual local number (local number) that monitoring devices 107 connect to in order to monitor a MA number (e.g., listen to audio transmitted between operator device 101 and a contact device 105). The operator device 101 may also utilize the local number to avoid long distances charges for MA numbers in different countries or area codes. In one embodiment, the request includes a given claimed virtual number (e.g., the local number) and the MA number. In response to the request, the agency service 115 associates the MA number with the local number and stores the association in a mapping table.

In some embodiments, a mapping request may optionally include the transmitting number of a monitoring device 107 which the agency service 115 associates with a MA number or local number to identify the monitoring device. As multiple monitoring devices 107A, 107B, 107C may monitor call audio, the agency service 115 may store multiple transmitting numbers of monitoring devices in association with a single MA number or local number in a mapping table.

In practice, agency service 115 consults the mapping table to automatically identify a device connecting to a virtual number (e.g., the MA number) as the operator device 101, monitoring device 107 or contact device 105 based on the device's transmitting number. Thus, for example, an operator of an operator device 101 may simply dial an MA number mapped to the transmitting number of his phone to place a call using a given MA number.

Personnel with a monitoring device 107 that desire to monitor the operator device 101 with a mobile or land-line phone at the agency 110A or in the field can dial the local number associated with the MA number (and, in some embodiments, the MA number itself). However, in one embodiment (e.g., connecting to a local number), as the agency service 115 does not identify the transmitting number of the device as that of the operator device 101, personnel devices are appropriately identified as monitoring devices 107. In some embodiments (e.g., connecting to a local number and/or MA number), the agency service 115 identifies connecting monitoring device 107 based on a mapping of monitoring devices' 107 transmitting numbers to the receiving number. Alternatively, the agency service 115 identifies the monitoring device 107 or operator device 101 responsive to personal identification number or code "PIN" entered when connecting to a virtual number.

Embodiments of the agency service 115 use the mapping of the operator device 101 to MA numbers for instructing the provider 127 to automatically dial (e.g., from an MA number or via call forwarding) the operator device when calls are received from contact devices 105 on an MA number mapped to the operator device for connecting the parties. Additionally, embodiments of the agency service 115 use the mapping of the operator device 101 to MA numbers for identifying when the operator device desires to use an MA number and instructing the provider 127 to dial (e.g., from an MA number) a contact device 105 specified by the operator and connect the parties. The agency service 115 may also provide operating devices 101 with caller and MA number details through the interface 145, via SMS message or email. Embodiments of the agency service 115 may also use mapping information to direct text messages received on an MA number to an operating device 101 and send text messages (e.g., from the operating device) from the MA number to entities on the network 120 such as contact devices 105.

Additionally, embodiments of the agency service 115 can use the mapping of monitoring devices 107 to MA numbers (e.g., directly, of via associated local numbers) for instructing the provider 127 to automatically dial (e.g., from a specified local number or the MA number) or otherwise notify (e.g., a SMS message) monitoring devices when calls are placed or received using a given MA number. The agency service 115 may also notify monitoring devices 107 through the interface 145 or via email.

To prohibit unauthorized access to MA numbers (and local numbers), the agency service 115 may allow personnel and operators to specify key-ins when provisioning and/or mapping virtual numbers. The agency service 115 stores the key-ins in the mapping table or other suitable database structure to identify and authenticate callers attempting connections to the virtual numbers responsive to correct key-ins. Depending on the embodiment, the agency 110, agency service 115 or provider 127 may store the mapping table and/or key-ins for device identification and authentication.

In some embodiments, the agency service 115 provides a MA module 141 to the operator device 101. The MA module 141 interfaces with the native dialer of the operator device 101 to automate the connection process to a given contact device 105. Additionally, the MA module 141 may interface with operator device 101 software and/or hardware to utilize features such as a GPS device to collect real-time position data. The MA module 141 transmits the collected data over the network 120 back to the agency service 115 or other entity. The agency service 115, in turn, may store the collected data for transmission to one or more monitoring devices 107 and the agency 110. Furthermore, the MA module 141 may be configured with a password or otherwise disguised when executed to prevent users other than the operator from accessing the module altogether and/or particular features. The MA module 141 is described in more detail with reference to FIG. 2.

In some embodiments, the agency service 115 includes an interface 145 for providing data received from operator devices 101 and call audio between operators and contacts to various monitoring devices 107 and/or appliances 150 over the network 120. For example, the interface 145 may provide monitoring devices 107 with data corresponding to the status (e.g., connected or disconnected) of one or more operator devices 101 and the corresponding MA number and contact device information. If the operator device 101 is transmitting real-time data or connected to a contact device 105, the interface 145 can stream data such as audio from the active transmission, GPS coordinates with heading, speed and coordinates of last-reported locations for placement on a map, and the internet protocol address and/or telephone numbers of other personnel monitoring or having access to the operator device or MA number. In some embodiments, the interface 145 syncs collected data prior to transmission or includes tags in the transmitted data for synchronization of playback at the monitoring device 107 or operator device 101. The interface 145 can also stream, or provide for download, previously recorded monitoring sessions.

In some embodiments, the agency service 115 provides a monitoring module 143 to monitoring devices 107 for accessing the interface 145. The monitoring module 143 transmits requests associated with configuring an operator device 101 and receiving real-time and historic data. For example, the monitoring module 143 may provide a user interface or status dashboard with options for provisioning virtual numbers, mapping a transmitting number of an operator device 101 or monitoring device 107 to a given virtual number and assigning key-ins for connecting to the virtual number. In one embodiment, the dashboard provides an option to toggle a recording session on or off with the agency service 115. When the recording session is disabled, the monitoring device 107 still receives real-time data, but the agency service 115, appliance 150 and provider 127 do not store copies of the collected data.

The monitoring module 143 may also display real-time status information for the operator device 101 including current GPS location, tracked GPS location, live audio, mapping table information and other information collected from the operator device, operator device 105, or MA number and streamed by the interface 145. Similarly, the monitoring module 143 may be used to access and playback historic activity associated with a given virtual number or operator device 101. For example, the monitoring module 143 may download files for playback or steam them. In addition to interfacing with the agency service 115, the monitoring module 143 may interface with an appliance 150 that stores (or backs up) collected data within the agency 110.

The monitoring module 143 may interface with the native dialer of the monitoring device 107 and notify the monitor when connection requests from virtual numbers are received (e.g., in instances where the monitoring device 107 is dialed in to monitor a call). Embodiments of the monitoring module 143 may also be configured to automatically establish the connection with the virtual number. The monitoring module 143 may display information for the virtual number and, optionally, the contact device 105 and/or operator device 101 using the virtual number with the notification. Displayed information for the virtual number, operator device 101, and/or contact device 105 may include associated number information, mapping information, and/or case information stored at the agency service 115, provider 127, and/or appliance 150. For example, the monitoring module 143 may communicate with the agency service 115 and/or appliance 150 to receive mapping information and case information corresponding to MA numbers (and operating devices) the transmitting number of the monitoring device 107 executing the monitoring module 143 is authorized to monitor. Additionally, the monitoring module 143 may include functionality of the MA module 141 and vice versa.

In one embodiment, the agency 110 includes an appliance 150 for storing data collected by operator devices 101 and call audio using MA numbers. The appliance 150 may utilize the monitoring interface 145 provided by the agency service 115 for updating stored data or receive data directly from operator devices 101. Additionally, the appliance 150 may receive audio recorded on a virtual number and associated transcripts from the provider 127 or agency service 115. One example embodiment of the appliance 150 also includes its own interface (not shown) that enables monitoring devices 107 and operator device to access real-time and historic data stored on the appliance for an MA number. Interfaces provided by the agency service 115 or appliance 150 may also be accessible via a web browser for streaming or downloading data and include the same or similar options.

Additionally, the appliance 150 and agency service 115 may communicate to intermittently update collected data and records at defined intervals or in response to notifications to download data. During the intervals or notification periods, the agency service 115 may process the data and perform any necessary actions as desired by operator devices 101 or monitoring device 107 until the data is transferred to the appliance 150. In some embodiments, the agency service 115 maintains a persistent connection with the appliance 150 to facilitate transfer of real-time data collected by operator devices 101 operated in the field.

In one embodiment, the agency service 115 insures that it, and the provider 127, do not possess data collected by operator devices 101 or from a virtual number beyond the time needed to facilitate transfer. However, in mission critical situations, operators and other agency 110 personnel cannot rely only on the availability of the appliance 150 for storing and maintaining collected data. Consequently, if the appliance 150 is unable to take possession of the collected data or go offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains an appliance instead of, or in addition to, the agency 110. In such cases, the appliance may exist as a dedicated piece of hardware or remote storage. Alternatively, embodiments of the appliance 150 may be implemented in a cloud computing and storage stack available on the network 120.

Operator Device Functionality

Figure 2:
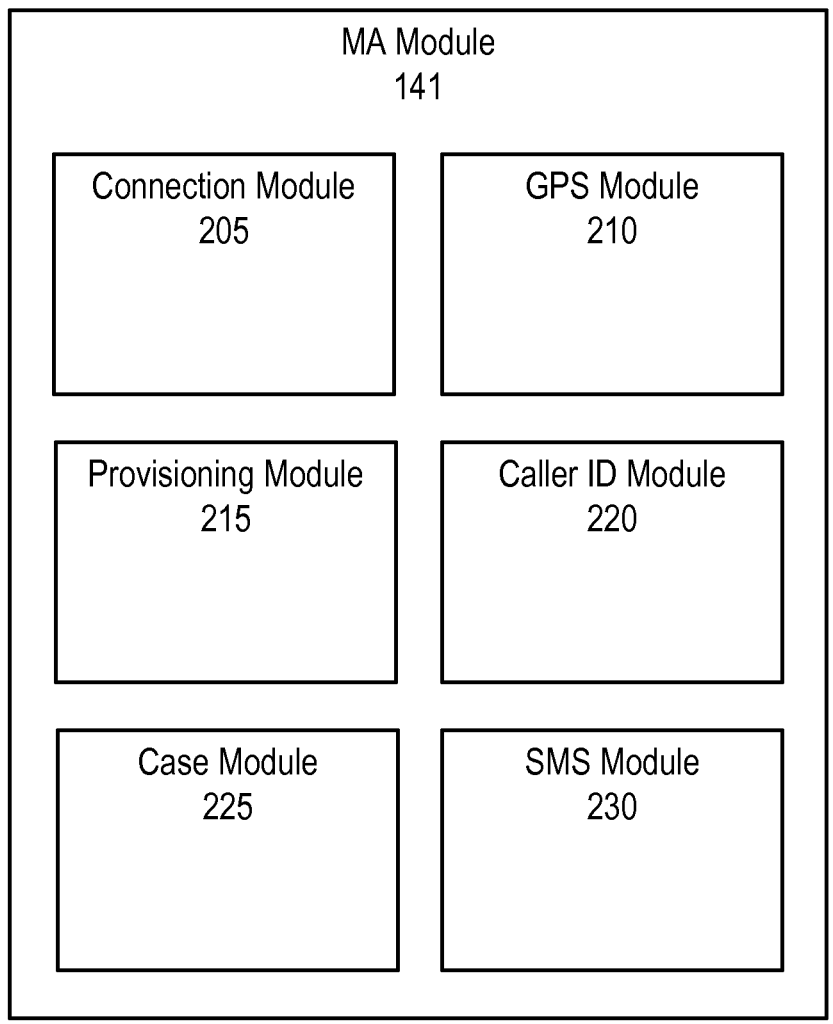
FIG. 2 is a block diagram illustrating a MA module according to one example embodiment.

FIG. 2 is a block diagram illustrating a MA module 141 according to one example embodiment. As mentioned above, the MA module 141 may be downloaded from the agency service 115 to the operator device 101 and executed to facilitate communications using MA numbers and collect and transmit data to entities on the network 120. As shown in FIG. 2, the MA module 141 itself includes multiple modules. In the embodiment shown in FIG. 2, the MA module 141 includes a connection module 205, GPS module 210, provisioning module 215, caller ID module 220, case module 225 and SMS module 230. In some embodiments, the functions are distributed among the modules in a different manner than described herein. Other embodiments have additional and/or other modules.

The connection module 205 automates the connection process for dialing out to a given contact. The connection module 205 receives input from the operator including an MA number associated with the operator device 101. In some embodiments, the connection module 205 further receives input indicating a local number associated with the operator device 101 or the MA number. Once a connection with the MA number is established, the connection module 205 transmits the number for a contact device 105 the operator desires to call over the network 120. The connection module 205 may allow the operator to enter the number of the contact device 105 prior to, or after establishing the connection with the MA number. Additionally, the connection module 205 may interface with the agency service 115 to receive information about MA numbers associated with a given local number or the transmitting number of the operator device 105. The connection module 205 may then present an interface to the operator indicating one or more available MA numbers with their number information for selection.

In one embodiment, the connection module 205 detects whether incoming calls were initially placed to a MA number. The connection module 205 subsequently determines MA number and/or contact device 105 information for display to the operator. In one embodiment, the connection module 205 accesses a locally or remotely stored address book to retrieve an address book entry associated with the MA number and/or contact device 105. Alternatively, the connection module 205 may receive and display notifications from the agency service 1115 or provider 127 about incoming calls. Based on the notification or address book information, the operator may review the appropriate identity expected by the contact and/or the contact.

Depending on the operator device's 101 capabilities, the communication module 205 may enable placement/receipt of multiple outgoing and incoming calls to virtual and non-virtual numbers within the native dialer application or similar.

The GPS module 210 communicates with a native GPS receiver on the operator device 101 to receive GPS location data. The GPS module 210 may also communicate with other radio receivers and directional mechanisms (e.g., compass or accelerometers) on the operator device 101 to receive additional location data. The GPS module 210 processes the GPS and radio location data to determine and refine an estimated location measurement for the operator device 101. The location measurement may include, but is not limited to, a latitude, longitude, altitude, heading, speed, associated accuracy measurement and the time and date of recording. The GPS module 210 transmits the determined location measurement over the network 120 the agency service 115 or other entity. In one embodiment, the GPS module 210 streams the location measurement in real-time.

The provisioning module 215 interfaces with the provider 127 or agency services 115 to provision virtual numbers and modify virtual number assignments and function in the field. Alternatively, a web browser on the operator device 101 may be used. For example, the web browser or provisioning module 215 may present the operator with a list of all virtual numbers associated with a given account, transmitting number, or local number. Through the interface, the operator may provision and modify mapping and function of the virtual numbers. Additionally, for example, the operator may specify number information for a virtual number or specify a ring tone for playback when the virtual number is dialed.

The caller ID module 220 interfaces with the provider 127 or agency services 115 to modify caller ID or other number information associated with provisioned virtual numbers. For example, the caller ID module 220 presents an interface to the operator to specify number information such as location, ownership, carrier and whether or not any of the information should be restricted or blocked when dialing out from a given MA number.

In some embodiments, the case module 225 interfaces with the provider 127, agency services 115 or appliance 150 to retrieve activities associated with a given MA number, local number or transmitting number. For example, the case module 225 presents an interface with MA numbers that the operator may select, for example, to view associated activity and number information. The case module 225 may further provide an interface for the operator to associate contact information or other information (e.g., address book entries) with a given MA number or contact number. The case module 225 may store the address book entries locally and/or remotely with the agency services 115 or appliance 150.

In some embodiments, the MA module 141 includes an SMS module 230 for sending SMS messages with and receiving SMS messages from an MA number. The SMS module 230 may send and receive SMS messages natively (e.g., via the provider 127) and/or send and receive non-native messages (e.g., via the agency services 115) depending on the device capabilities. The SMS module 230 provides an interface to the operator for selecting or otherwise specifying an MA number to use for sending an SMS message and the number of the contact device 105 that should receive the message. The SMS module 230 communicates (e.g., using the SMS itself or via the interface 145) the information for sending the SMS message to the agency service 115 and/or the provider 127. The SMS module 230 may further receive SMS messages sent to a MA number natively or via the interface 145. In one embodiment, the SMS module 230 mimics the look and feel of a native SMS program on the operator device 101.

In some embodiments, the MA module 141 and the modules therein interface and communicate with non-native devices attached to the operator device 101. For example, audio and location data can be determined from accessories coupled (e.g., wired microphone) or wirelessly connected (e.g., Bluetooth headset) to the operator device 101.

Additionally, some or all of the features provided by the MA module 141 may require the operator to enter a specified key-in (e.g., button press combination, password or other personal identification) prior to operation or launch.

Virtual Number Provisioning

Figure 3A:
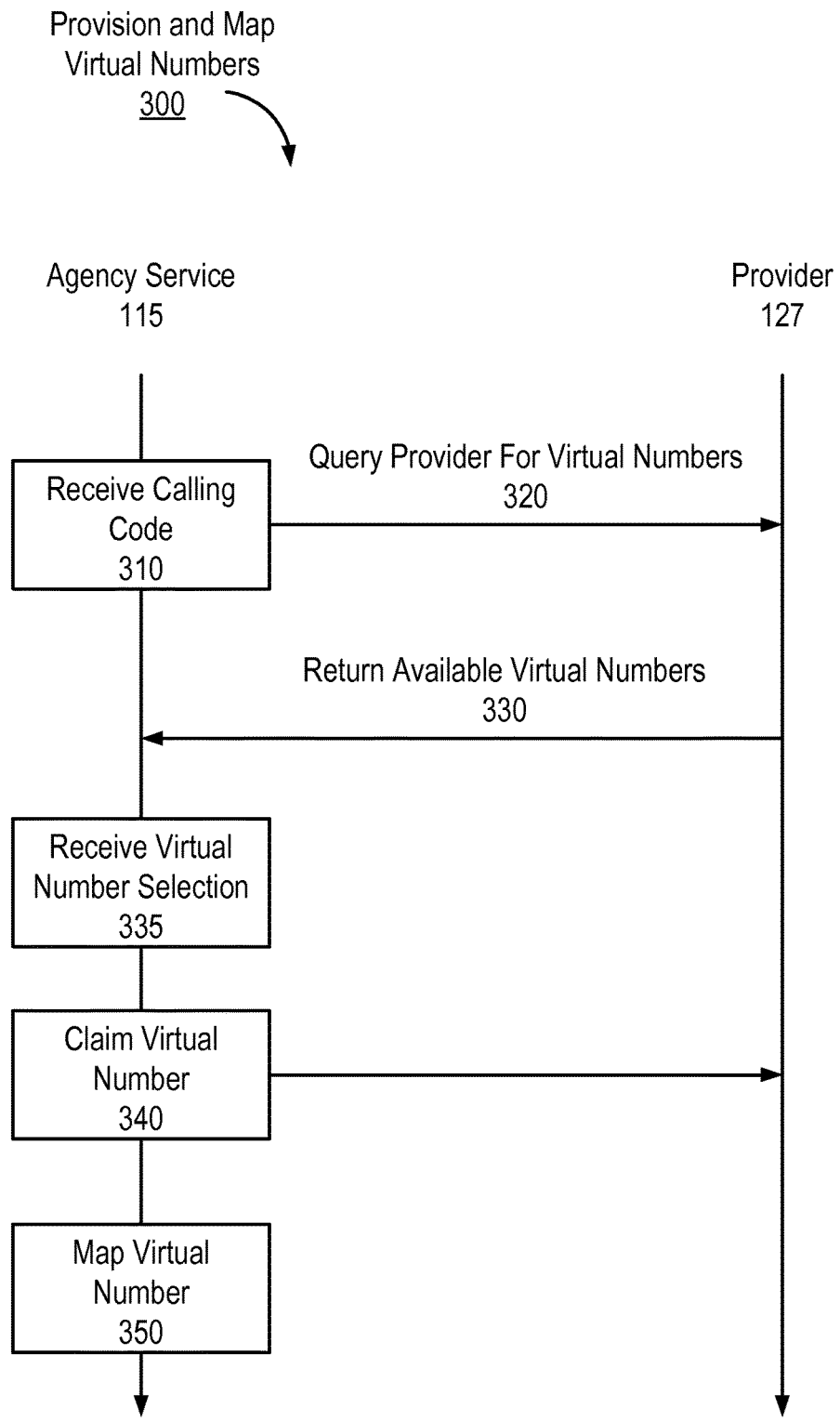
FIG. 3A is an interaction diagram illustrating a method for provisioning and mapping virtual numbers for operating an operator device with MA numbers according to one example embodiment.

FIG. 3A is an interaction diagram illustrating a method for provisioning 300 and mapping virtual numbers for operating an operator device 101 with MA numbers according to one example embodiment. Initially, the agency service 115 receives 310 a request including a calling code for provisioning 300 a virtual number from a monitoring device 107, operator device 101, provided web interface or other entity. The calling code can include an area code and country code where the provisioned virtual number will be operated.

The agency service 115 queries 320 the provider for virtual numbers matching the specified calling code. The provider 127 returns 330 a list of available virtual numbers to the agency service 115 which, in turn, transmits the virtual numbers for display to the requestor. The agency service 115 receives 335 one or more virtual number selections and claims 340 each selected virtual number from the provider 127. The agency service 115 may optionally include modified number information for a claimed virtual number. For example, the agency service 115 may optionally include corresponding ANI and caller identification information for a virtual number. Additionally, the agency service 115 may optionally include a ring tone specified for playback when the virtual number is dialed. The number information may be edited on the requesting device 101, 107 or in the web interface. The agency service 115 subsequently stores the modified virtual number information and instructs the provider 127 to update the associated virtual number information to configure the virtual number.

With one or more virtual numbers claimed, the agency service 115 can receive mapping requests for the virtual numbers and, in turn, map 350 the virtual numbers responsive to information in the mapping request. For example, the requestor may be prompted to enter the transmitting number of an operator device 101 for association with a virtual number to be used as a MA number. The agency service 115 stores the transmitting number of the operator device 101 and the MA number in a mapping table (e.g., at the agency service 115 or on the appliance 150). The requestor may modify the mapping at any time, without any interruption of service at the receiving number.

Oftentimes, MA numbers have a different country code (or area code) than monitoring devices 107 or the operator device 101 connecting to an MA number to monitor or place/receive calls on the MA number. In some cases, the requestor knows the country code or area code where the monitoring devices 107 and/or operator device 101 are located. Accordingly, to avoid costly charges for the agency 110A, the agency service 115 enables the requestor to provision additional virtual numbers with the known country codes and area codes for use as local numbers. The agency service 115 may then receive mapping requests for the local numbers (e.g., to map the transmitting number of the operator device 101) and, in turn map local numbers to specified MA numbers.

When operator device 101 subsequently dials a local number, the agency service 115 identifies the associated MA number from the mapping table. The agency service 115 may further identify the transmitting number or operator PIN associated with the MA/local number and authenticate the operator device 101 (e.g., based on the transmitting number or PIN). In turn, the agency service 115 instructs the provider 127 to connect the operator device 101 to the MA number or pass audio from the MA number to the local number and connect the operator device to the local number.

When a monitoring device 107 dials a local number, the agency service 115 identifies associated MA numbers from the mapping table. The agency service 115 may further identify a monitoring number or monitor pin associated the MA/local number and authenticate the monitoring device 107. In turn, the agency service 115 instructs the provider 127 to connect the monitoring device 107 to the MA number or pass audio from the MA number to the local number and connect the monitoring device to the local number. Additionally, as the monitoring device 107 should not tip off the contact or otherwise interfere with call status (e.g., ringing, active, etc.), connection/disconnection of the monitoring device 107 (e.g., to/from a virtual number or other device or entity) may be delayed or otherwise modified (e.g., muted for the contact device 105 and optionally the operator device 105) as not to affect call status or tip off the contact.

In some embodiments, local numbers may be tied to the transmitting number of an operator device 101 for automatic mapping to MA numbers. For example, an operator using the same operator device 101 for multiple investigations in different counties may utilize a different MA number for each investigation (e.g., to keep distinct records or maintain a specific identity). Rather than requiring the operator or personnel monitoring the operator to assign local numbers (or frequently modify mapping) to each MA number on an individual basis, a local number may be tied to the operator device 101. When the operator device 101 is mapped or used with a MA number, the agency service 115 maps the tied local number to the MA number. In such a way, a given local number may be dedicated to monitoring/supporting a particular operator device 101. As multiple MA numbers may be associated with a single local number, operating devices 101 or monitoring device 107 dialing the local number may be presented with a list of the mapped MA numbers available for placing a call or monitoring. A requestor may re-specify the mapping configuration as needed to change or swap claimed virtual numbers and transmitting numbers between MA numbers and local numbers.

Example embodiments of monitoring device 107 mapping to MA numbers and/or local numbers can be performed in the same or similar fashion as operator device 101 mappings. Monitoring device 107 mapping to MA number and/or local numbers may be used to authorize monitoring devices to listen in on call audio between an operator device 101 and contact device 105. Additionally, the mapping may be used to automatically notify a specified monitoring device 107 when the corresponding MA number is used for communications.

FIG. 3B is a table illustrating an example embodiment of virtual number mapping 350 for operating an operator device 101 with MA numbers. As shown, mapping table 360A includes a number of MA numbers 363A mapped to a corresponding transmitting number 361A (e.g., of operator device 101).

When the agency service 115 receives connection requests to MA numbers 363A from the network 120, the agency service identifies the connecting device as the operator device 101 based on the transmitting number 361A stored in the mapping table 360A. In turn, the agency service 115 or provider 127 receives a contact number from the operator device 101 and dials the corresponding contact 105 from the MA number 363A. If the connecting device's number does not match the transmitting number 361A, the agency service 115 identifies the device as a contact device 105 and dials or instructs the provider 127 to dial the specified transmitting number for the operating device 101.

Prior to permitting the operator device 101 to place a call to or receive a call from the MA number or local number, the agency service 115 may wait or instruct the provider 127 to wait for key-in of a specified password. For example, in some instances, the provider 127, telephony 125/PSTN or agency service may fail to correctly identify or pass a transmitting number of a device or a virtual number for forging a connection. If an improper password or no password is received for a local number, the device is disconnected. For a MA number, as contacts 105 dial the number, if an improper password or no password is received (e.g., within a brief time frame of placing the call) the operator device 105 is dialed. In one embodiment, the operator must enter the password or key-in enter a password (e.g., hitting * or # prior to entering the password) within a given time period (e.g., 2-5 seconds) without being prompted to mitigate suspicion when the line is dialed by another party.

Similar precautions may be implemented to authenticate monitoring devices 107 that dial the local number to monitor the call. In some embodiments, the mapping table 360A further includes mappings of monitoring device 107 transmitting numbers to explicitly identify authorized monitoring devices in addition to operating devices 101.

FIG. 3C is a table illustrating an example embodiment of virtual number mapping 350 for operating an operator device 101 with MA numbers. As shown, mapping table 360B includes a number of MA numbers 363B mapped to a corresponding transmitting number 361B (e.g., of operating device 101). Additionally shown are a number of local numbers 365 mapped to the MA numbers 363B.

When the agency service 115 receives connection requests to local numbers 365 from the network 120, the agency service identifies the connecting device as a monitoring device 107 or operator device 101 (e.g., based on mapped transmitting numbers or monitor/operator PIN) and identifies the associated MA numbers 363B from the mapping table 360B. The agency service 115, in turn, instructs the provider 127 to connect the device 101, 107 with a specified MA number 363B (e.g., directly, or through the local number 365).

If the agency service 115 identities the device as the operator device 101, the operator may further enter the number of the contact they desire to dial from the MA number. The agency service 115, in turn, instructs the provider 127 to dial out to the specified contact number from the MA number.

Prior to connecting the monitoring device 107 or operator device 101, key-in of a specified password may be required. In some embodiments, the mapping table 360B further includes mappings of monitoring device 107 transmitting numbers to explicitly identify authorized monitoring devices in addition to operator devices 101.

FIG. 3D is a table illustrating an example embodiment of virtual number mapping 350 for automatically notifying a monitoring device 107. As shown, mapping table 360C includes a number of MA numbers 363B mapped to a corresponding monitoring number 367 (e.g., of monitoring device 107).

When the agency service 115 receives connection requests to MA numbers 363C from the network 120, the agency service may identify the connecting device as a contact device 105 or operator device 101 using, for example, mapping table 360A and/or 360B as described above. The agency service 115 enables operator devices 101 to specify a contact device 105 for dialing out to from the MA number 363C and contact devices 105 to communicate with the operator device 101 corresponding to the dialed MA number 363C. In either instance, the agency service 115 may identify one or more monitoring numbers 367 associated with the MA number 363C. The agency service 115, in turn, may automatically instruct the provider 127 to dial out to the identified monitoring numbers 367 when the MA number 363C is used such that the monitoring devices 107 may receive call audio in real-time.

In the embodiment shown in FIG. 3D, the agency service 115 may instruct the provider 127 to dial out from the MA number 363C or otherwise connect the monitoring device 107 with the MA number 363C. In such cases, audio transmitted from the monitoring device 107 or associated with connection process (e.g., any dial tones) to the MA number 363C may be disabled.

In other embodiments, a monitoring number 367 may be associated with a MA number 363C via mapping to a corresponding local number 365 (not shown). Accordingly, the agency service 115 identifies monitoring numbers 367 based on the mapping to the local number 365. In such cases, the agency service 115 may instruct the provider 127 to dial out to identify monitoring numbers 367 via the local numbers 365 and pass call audio from the MA number to the local number. Depending on the embodiment, the agency service 115 may instruct the provider 127 to disable audio from the local number 365 to the MA number 363 or from the monitoring devices 107.

FIG. 4 is an interaction diagram illustrating a method for connecting 400 an operator device 101 and contact 105 using a virtual number according to one example embodiment. FIG. 4 additionally illustrates a method for connecting 400 a monitoring device to virtual number according to one example embodiment. Once the agency service 115 provisions 300 a virtual number with the provider 127, an operator device 105, monitoring device 107 or contact 105 may connect 400 to the virtual number. However, each entity may be treated differently as explained below.

For any device 101, 105 or 107 dialing 410 the virtual number, the provider 127 receives the connection request via the telephony network 125 and identifies 420 the dialed number as a virtual number provisioned 300 by agency service 115. Accordingly, in embodiments where the agency service 115 stores the mapping table, the provider 127 passes the transmitting number of the device attempting to connect to the virtual number and the virtual number to the agency service 115.

The agency service 115, in turn, identifies 430 the device attempting to connect to the virtual number as an operator device 101, monitoring device 107 or contact 105 based on the mapping table. The agency service 115, in turn, instructs the provider 127 to connect (or disconnect) 440 the identified device and provide options or perform operations according to the device's classification.

Operator Device

In the case of the operator device 101 dialing an MA number, the agency service 115 determines that the transmitting number stored in the mapping table for the dialed MA number matches the number of the device attempting to connect to the MA number. The agency service 115 then instructs the provider 127 to connect 440 the device to the MA number as the operator device 101.

Alternatively, if the agency service 115 determines that the operator device 101 is attempting to connect to a local number, the agency service determines that the transmitting number stored in the mapping table for the dialed local number (and/or associated MA numbers) matches the number of the device. The agency service 115 then instructs the provider 127 to connect 440 the device to the local number as the operator device 101. If only one MA number exists in the mapping table for the local number, the agency service 115 may automatically instruct the provider 127 to connect the operator device 101 with the MA number (e.g., directly or via the local number). Alternatively, if there are multiple MA numbers assigned to the local number, a menu with details about the MA numbers may be provided for the operator to select a given MA number. For example, "press 1 for John Doe," "press 1 for Restricted/Blocked" or "press 1 for 555-111-5555" where "John Doe" and "555-111-5555" may be number information for a corresponding MA number and restricted or blocked indicates that an MA number will not display number information when used.

Once the operator device 101 connects to the desired MA number (e.g., via selection or directly), the operator may enter the number of the contact device 105 (e.g., transmitting number of the contact's device) that the operator would like to dial from the MA number. The provider 127, in turn, dials out 500 to the contact number from the MA number (displaying MA number information) and connects the parties. In some embodiments, the agency service 127 may identify a monitoring number of a monitoring device 107 associated with the MA number or local number in the mapping table. The agency service 127, in turn, may instruct the provider 127 establish a connection with the monitoring device 107 for passing call audio between the contact device 105 and the operator device 101 on the MA number. Example embodiments of dialing out to a contact device 105 are explained in more detail with reference to FIG. 5A.

Monitoring Device

In the case of a monitoring device 107 dialing a MA number, the agency service 115 may determine that a transmitting number for a monitoring device stored in the mapping table for the dialed MA number matches the number of the device. The agency service 115 then instructs the provider 127 to connect 440 the device to the MA number as a monitoring device 107 and disable (e.g., mute) audio received from the monitoring device 107. FIG. 3D illustrates an example mapping table for specifying transmitting numbers of monitoring devices that may be automatically dialed in to monitor a MA number, according to one embodiment. A similar table may be used to authorize monitoring device 107 access to MA numbers and/or further indicate which monitoring devices 107 having general access should be dialed in when a MA number is used by an operator.

Alternatively, if the agency service 115 determines that the device is attempting to connect to a local virtual number, the agency service may determine that the number of the device does not match the transmitting number of the operator device stored in the mapping table. For example, the agency service 115 may determine the operator device 101 transmitting number stored in the mapping table for the dialed local number (and/or associated MA numbers) and identify devices connecting to the local number that do not match the operator device's transmitting number as monitoring devices. In other embodiments, the agency service 115 may identify the monitoring device 107 based on matching a monitoring device transmitting number stored in a mapping table for the local number or MA numbers with that of the connecting device. The agency service 115 then instructs the provider 127 to connect 440 the device to the local number as the monitoring device 107. If only one MA number exists for the local number, the agency service 115 may automatically instruct the provider 127 to connect the monitoring device to the MA number as described above (e.g., with audio disabled) or, alternatively, pass audio from the MA number (e.g., call audio between the operator and contact) to the local number. Audio from the local number to the MA number may be disabled such that audio received from monitoring devices need not be disabled on the local number. Alternatively, if there are multiple MA numbers assigned to the local number, a menu with details about the MA numbers may be provided for the operator to select a given MA number. The provider 127 and/or the agency service 115 may additionally notify personnel using the monitoring device 107 which MA numbers are active.

In some embodiments, the monitoring devices 107 may communicate with other devices monitoring a given MA number through a local number (e.g., like a conference call) although no audio is transmitted to the contact device 105 and operator device 101 on the MA number. Additionally, the provider 127 or agency service 115 may provide the monitoring devices 107 with key combinations (e.g., *1, 2, etc.) to mute other monitoring devices 107, audio on the MA number or their own device.

Contact Device

In one embodiment, the agency service 115 identifies 430 devices with numbers that do not match a transmitting number stored in the mapping table for a MA number as contact devices 105. The agency service 115 identifies the transmitting number associated with the MA number and instructs the provider 127 to connect 440 the contact device 105 to the operator device 101 (e.g., by dialing out 500 to the operator device 101 directly, or through the MA number). In some embodiments, the agency service 127 may identify a monitoring number of a monitoring device 107 associated with the MA number in the mapping table. The agency service 127, in turn, may instruct the provider 127 establish a connection with the monitoring device 107 for passing call audio between the contact device 105 and the operator device 101 on the MA number. Example embodiments of dialing out 500 to the transmitting number of an operator device 101 are explained in greater detail with reference to FIG. 5B.

Additional Considerations

In some embodiments, the PSTN or provider 127 fails to pass the transmitting number associated with an operator device 101 (or monitoring device 107) to the provider or agency service 115. For example, the provider 127 or agency service 115 may receive a number other than the operator device's 101 and incorrectly identify the operator device. Some example PSTN and provider 127 failures are all zeroes numbers (+00 000-000-0000), restricted numbers (737-874-2833) or simply an incorrect number for the operator device 101. In any instance, the agency service 115 may be unable to identify the operator device 101 by the received transmitting number.

The agency service 115 may recognize that some numbers are passed incorrectly (e.g., a restricted number or zeroes number). In response (e.g., for calls to a local number), the agency service 115 may play a prompt or instruct the provider 127 to play a prompt such as "press 1 for an operator device or press 2 for a monitoring device." The prompt can also be ambiguous (e.g., please enter the extension of the party you are trying to reach or similar). Operators or personnel may then key-in as using an operator device 101 or monitoring device 107.

Alternatively, as the key-ins of the operator device 101 and monitoring device 107 typically differ, the agency service 115 may instruct the provider 127 to simply play a generic tone or number not available recording to notify users that they need to key-in. The matching of a key-in with stored authentication information identifies the operator device 101 (or monitoring device 107) on the local number.

In some embodiments, the agency service 115 may prompt all devices connecting the local number to key-in for identification. For example, an agency 110A may want to enable the option to use unmapped devices as operator devices 101 on a specified MA number.

While prompts are effective for identification on a local number (e.g., as only operators and personnel typically have knowledge of the number and it may further require key-in of a PIN), these methods are ineffective for number pass failures to MA numbers as contacts 105, typically, must be tricked into believing they are making a legitimate, confidential call when they (as opposed to the operator device 101 or monitoring device 107) dial the MA number. Accordingly, PSTN or provider 127 failures to pass the transmitting number associated with a device making a call to an MA number may be handled differently.

In one embodiment, the agency service 115 may instruct the provider to begin the dial out 500 process as if the unidentified device were a contact device 105. Once the dial out 500 begins, the operator or personnel will realize that their device was not recognized (e.g., because no menu was presented or prompt was played and the provider 127 is dialing out). The contact, on the other hand, would assume operation as normal. In order to capitalize on this difference, the agency service 115 may instruct the provider 127 to capture a key-in during the dialing process for identifying the requesting device as a monitoring device 107 or operator device 101. The requesting device is then identified and connected according to the provided key-in.

Operating an Operator Device

Figure 5A:
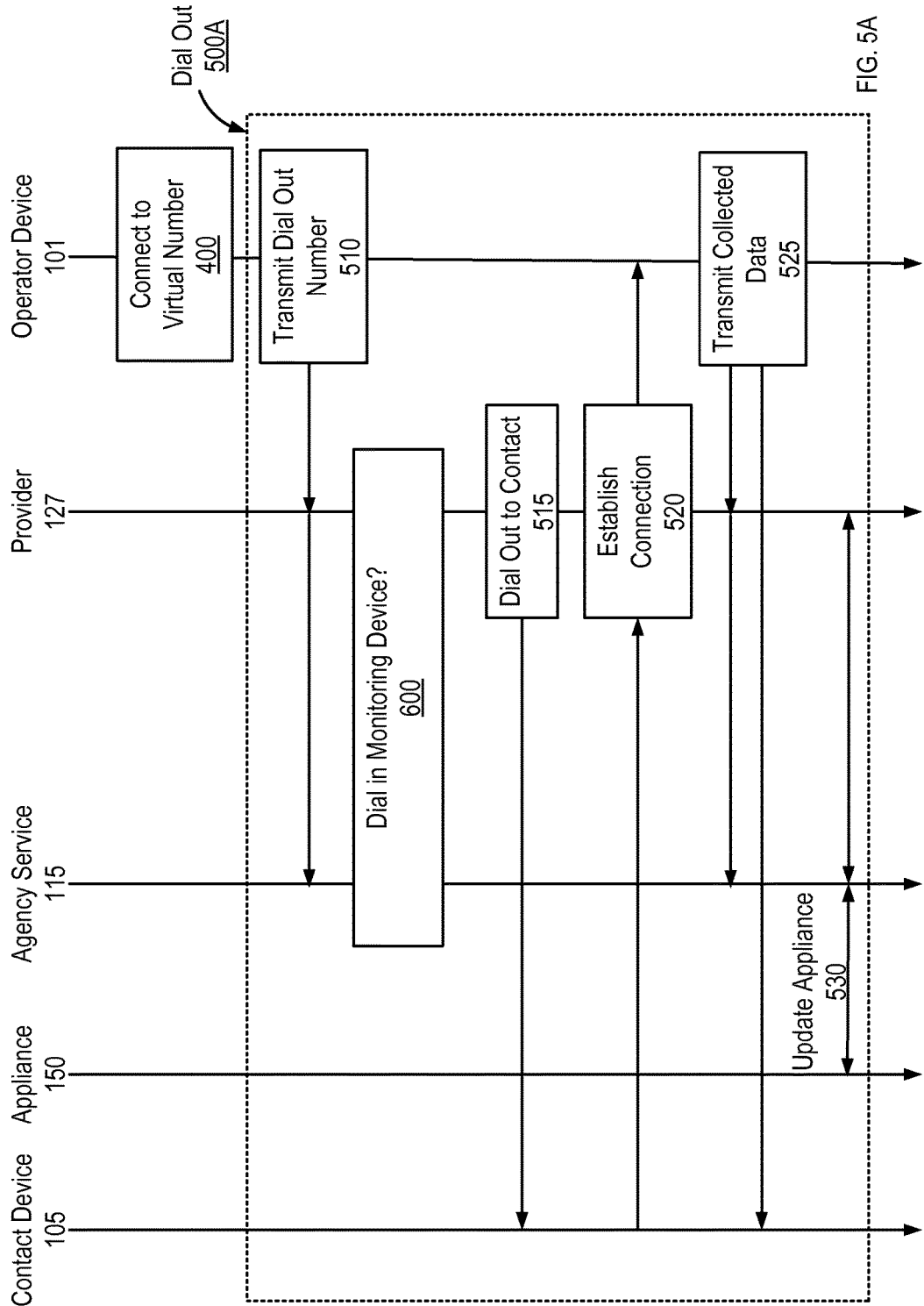
FIG. 5A is an interaction diagram illustrating a method for dialing out to a contact device using a MA number, according to one example embodiment.

FIG. 5A is an interaction diagram illustrating a method for dialing out 500A to a contact device 105 using a MA number, according to one example embodiment. Once the connection 400 between the operator device 101 and the MA number is established, the operator may enter the transmitting number of a contact device 105. Alternatively, the number of the contact device 105 may have been previous entered in an application. In either instance, the operator device 101 transmits 510 the dial out number to the provider 127. The provider 127, in turn, dials out 515 to the contact device 105 from the MA number. Thus, when the contact device 105 receives the connection request, the call appears to be coming from the MA number. Accordingly, the contact device 105 will display number information (if any, e.g., for blocked or restricted number) for the MA number rather than the operator device 105. If the contact device 105 picks up, the provider 127 establishes 520 a connection between the operator device 105 and the contact device 105 (e.g., through the MA number or local number, or directly as the contact device will not receive additional number or device information from the operator device). The operator device 101 and/or provider 127 may optionally transmit the number of the contact device 105 to the agency service 115 for records keeping or to open a new record.

Once the connection 520 between the operator device 101 and the contact device 105 is established, the provider 127 may begin recording audio on the line. The operator device 101 collects audio data using a microphone coupled to the operator device. The operator device 101, in turn, transmits 525 the collected audio data to the provider 127 and contact device 105 by way of the connection through the MA number. The contact device 105 communicates with the operator device 101 in a similar fashion. The provider 127 may additionally enable monitoring devices 107 to connect to the MA number or local number to monitor the call and/or transmit the audio data received from the operator device 101 and the contact device 105 to the agency service 115 or appliance 150 over the network 120.

Furthermore, the operator device 101 may also collect location data from GPS receivers and other direction mechanisms coupled to the operator device. The operator device 101 may determine a location measurement including the position of the operator device, direction and speed of the operator device and associated accuracy of the measurement. The operator device 101 transmits 525 the location measurement to the agency service 115. In some embodiments, the operator device 101 determines and transmits 525 the location measurements in real-time to the agency service 115.

The provider 127 and/or the agency service 115 may update 530 the appliance 150 with the received audio data. The agency service 115 or provider 127 may also update 530 the appliance with any other data received from the provider 127 and/or operator device 101.

In some embodiments, the agency service 115 may instruct the provider 127 to automatically dial in 600 a monitoring device 107 for receiving call audio between the operator device 101 and contact device 105. The agency service 115 may identify monitoring devices 107 to dial in 600 based on mapping table information, for example, as illustrated in FIG. 3D. In one embodiment, the provider 127 dials in 600 the monitoring device 107 temporally proximate to dialing out 515 to the contact such that the monitor substantially receives call audio in real time. Other embodiments may dial in 600 a monitoring device in an order other than that illustrated in FIG. 5A.

FIG. 5B is an interaction diagram illustrating a method for dialing out 500B to an operator device 101 using a MA number, according to one example embodiment. As described above, the contact device 105 initiates 400 a connection to a MA number and the agency service 115 instructs the provider 127 to connect the contact device 105 to the operator device 101. Accordingly, the agency service 115 transmits 510 the transmitting number of the operator device 101 as stored in the mapping table for the MA number to the provider 127. Depending on the embodiment, the agency service 115 and/or provider 127 may be configured to coordinate connection of the contact device 105 with the MA number and subsequent dialing the operator device 101 or dialing the operator device 101 directly.

Connection Through MA Number

The agency service 115 may instruct the provider 127 to connect the contact device 105 to the MA number but continue to play a ring tone on the line after establishing the connection. In effect, the contact device 105 is connected to the MA number but does not know a connection has already been established because the ring tone is still playing. Temporally proximate to establishing the connection between the contact device 105 and the MA number, the provider 127 dials out 515 to the provided transmitting number of the operator device 101. In response to the operator device 101 answering the call, the provider 127 stops the ring tone played for the contact device 105 and establishes the connection 520 between the parties. If the operator device 101 does not answer, the provider 127 may direct the contact device 105 to a voice mail box associated with the MA number or disconnect the contact device 105.

As ring tones can differ between countries, and for a host of other reasons, the ring tone played for the contact may need to differ from a default ring tone for the MA number, e.g., based on the location of where the MA number is based. For example, if the MA number is based in the United Kingdom and the contact expects the operator to be in the United States, the contact may hear an incorrect ring tone as the United Kingdom ring tone may be played. Accordingly, the agency service 115 may instruct the provider 127 to play, and continue to play a ring tone specified (e.g., a specified mp3 file) for the MA number. The ring tone specified for the MA number may be that of the location where the MA number is based (e.g., default, based on country code) or that of a location where the operator using the MA number is expected to be (e.g., configured, by the agency service 115 or other entity). Thus, the expected ring tone may be played for the contact.

Direct Connection

The agency service 115 may instruct the provider 127 to connect the contact device 105 to the operator device 101 by forwarding the call to the transmitting number of the operator device 101 to dial out 515. Typically, this process would result in the contact hearing the ring tone of the operator device 101. As ring tones can differ between countries, and for a host of other reasons, the ring tone being played may be different than the ring tone expected for the MA number. For example, if the MA number is based in the United Kingdom and the operator device 101 is located in the United States, the ring tones may differ. If the contact expects the operator to be in the United States, the contact would hear the expected ring tone. However, if the contact expects the operator to be in the United Kingdom, the contact may hear an incorrect ring tone. Additionally, if the contact expects the operator to be in a country other than the United Kingdom or United States, the contact may hear an incorrect ring tone in either case. Accordingly, the agency service 115 may instruct the provider 127 to play the ring tone specified (e.g., a specified mp3 file) for the MA number rather than that of the operator device 101 being dialed. The ring tone specified for the MA number may be that of the location where the MA number is based (e.g., default, based on country code) or that of a location where the operator using the MA number is expected to be (e.g., configured, by the agency service 115 or other entity). Thus, the expected ring tone may be played for the contact.

In some embodiments, the provider 127 plays an mp3 file of the ring tone specified for the MA number to the contact device 105. Alternatively, the provider 127 may dial the MA number itself, where the MA number is configured with the desired (or default) ring tone, and pass the ring tone audio to the contact device 105. In either instance, the provider 127 suppresses the ring tone of the operator device 101, for example, by disabling audio from the operator device, until the operator device 101 answers the call. Once the operator device 101 answers, the provider 127 establishes the connection 520 between the parties and may pass audio on the line between the parties and optionally to a local number or monitoring device 107 connected to the MA number for monitoring and/or recording. If the operator device 101 does not answer, the provider 127 may direct the contact device 105 to a voice mail box associated with the MA number or disconnect the contact device.

In some embodiments, the provider 127 and/or agency service 115 may provide notification information 517 to the operator device 101. The notification information 517 includes contact device 105 and/or MA number information describing the caller and identity expected from the operator. In some embodiments, notification information 517 may be injected into, or included with, caller identification information provided for a typical call. In other embodiments, notification information 517 may be provided in a SMS message or otherwise transmitted to the operator device 101 for display using an MA module 141. In one embodiment, rather than immediately establishing 520 the connection between the operator device 101 and the contact device 105 when the operator device 101 answers, the provider 127 transmits audio data including notification information 517 for the operator. The agency service 115 may further instruct the provider 127 to provide options to accept the call, disconnect the call or forward the call to voicemail of the MA number (e.g., by hanging up or selecting a provided option).

Once the connection 520 between the operator device 101 and the contact device 105 is established, the provider 127 records audio on the line. The operator device 101 collects audio data using a microphone coupled to the operator device. The operator device 101, in turn, transmits 525 the collected audio data to the provider 127 and contact device 105 by way of the connection through the MA number. The contact device 105 communicates with the operator device 101 in a similar fashion. The provider 127 may additionally enable monitoring devices 107 to connect to the MA number or local number to monitor the call and/or transmit the audio data received from the operator device 101 and the contact device 105 to the agency service 115 or appliance 150 over the network 120.

Furthermore, the operator device 101 may also collect location data from GPS receivers and other direction mechanisms coupled to the operator device as described above with reference to FIG. 5A. The provider 127 and/or the agency service 115 may update 530 the appliance 150 with the received audio data. The agency service 115 or provider 127 may also update 530 the appliance with any other data received from the provider 127 and/or operator device 101.

In some embodiments, the agency service 115 may instruct the provider 127 to automatically dial in 600 a monitoring device 107 for receiving call audio between the operator device 101 and contact device 105. The agency service 115 may identify monitoring devices 107 to dial in 600 based on mapping table information, for example, as illustrated in FIG. 3D. In one embodiment, the provider 127 dials in 600 the monitoring device 107 temporally proximate to dialing out 515 to the operator such that the monitor substantially receives call audio in real time. Other embodiments may dial in 600 a monitoring device in an order other than that illustrated in FIG. 5B.

SMS Communications

In addition to placing and receiving calls though virtual numbers, the operator device 101 may also send and receive SMS messages through MA numbers. Depending on the embodiment of the operator device 101, SMS messages may be sent/received via native SMS capability or using an application or web browser. Thus, the operator device 101 need not require telephony capability for SMS communications through a MA number.

Sending a SMS Message

In one embodiment, to send an SMS from a MA number to the contact device 105, the operator prepends or appends (e.g., manually or using a MA module 141) a native SMS message (e.g., To: [contact number]|The meeting is at 10 am) sent to the MA number from the operator device 101 to indicate the intended contact device 105. The provider 127 forwards SMS messages received on the virtual numbers to the agency service 115 for processing. The agency service 115 parses the SMS to determine information about the contact device 105, such as a transmitting number pre-prended or appended to the SMS message. The agency service 115 may also parse the SMS to determine the transmitting number of the source (e.g., for look-up in a mapping table) and/or key-in information for authentication of the source. In turn, the agency service 115 extracts the transmitting number of the contact, any device information associated with the operator device and any formatting or key-in information from the SMS message. The agency service 115 then instruct the provider 127 to transmit the modified SMS message to the extracted contact number from the MA number that originally received the SMS. In some embodiments, the MA module 141 provides an interface for the user to enter an MA number and contact number, which are automatically attached to the SMS.

Alternatively, embodiments of the operator device 101 may communicate data for transmitting via SMS from the MA number to the agency service 115. For example, embodiments of the MA module 141 or a web interface may provide a menu or interface for the user to enter or otherwise select a given MA number and transmitting number of a contact device 105. The interface further provides the operator with the ability to enter message content. The operator may then submit the message and associated information to the agency service 115. The agency service 115 then instructs the provider 127 to transmit an SMS message containing the message to the specified contact number from the specified MA number.

Once the SMS is delivered, the provider 127 and/or agency service 115 may confirm receipt of the SMS at the contact device 105 with operator device 101 or other entity and/or update the appliance 150 with a copy of the SMS and associated information.

Receiving a SMS Message

In one embodiment, to receive an SMS sent to a MA number from the contact device 105, the provider 127 transmits data (e.g., SMS messages) received on the virtual numbers to the agency service 115 for processing. The agency service 115 may then parse the SMS. However, as the SMS message content does not include appended or prepended information (e.g., in the correct format with a transmitting number), the agency service 115 identifies the SMS message as an inbound message on the MA number for delivery to the operator device 101. The agency service 115 may also determine information about the received message, the contact device 105 (e.g., the transmitting number of the device) and/or MA number the message was received on and append or prepend a SMS message with the information. In turn, the agency service 115 determines the transmitting number of the operator device 101 associated with the MA number that received the SMS message and instructs the provider 127 to transmit the SMS message to the operator device 101 with any attached information.

The agency service 115 may instruct the provider to transmit SMS messages to the operator device 101 from the MA number the message was received on to prevent inadvertent, direct communication with the contact device 105. For example, the agency service 115 or provider 127 may prepend a SMS message with the transmitting number of the contact device the original SMS message was received from. In turn, the agency service 115 may and send the prepended SMS, including the original message content (e.g., From: [contact number]|The meeting is at 10 am), from the MA number to the operator device 101.

In some embodiments, the MA module 141 provides an interface for the user to view SMS messages. The MA module 141 may parse the SMS message to determine MA number and/or contact device 105 information attached by the agency service 115 and extract the attached information for presentation in an interface.

Alternatively, the agency service 115 may communicate content from SMS messages received on an MA number and associated contact and MA number information to the operator device 101. For example, embodiments of the MA module 141 may receive and display messages and associated information in an interface for the operator. Alternatively, the agency service 115 may provide a web interface to display the received SMS and associated information.

Once the SMS is delivered, the provider 127 and/or agency service 115 may confirm receipt of the SMS at the operator device 101 or other entity and/or update the appliance 150 with a copy of the SMS and associated information.

In some embodiments, the agency service 115 may notify a monitoring device 107 when SMS messages are sent from the MA number. As described above, messages from the operator device 101 to the contact device 105 (and vice versa) may be sent through the virtual number, albeit with a different format. Thus, for example, whenever the agency service 115 instructs the provider 127 to send a SMS message using the MA number, the agency service 115 may prepare a notification for transmission to the monitoring device 107 based on the sent SMS message information. In one embodiment, the notification is also a SMS message, which is prepended with contact, MA number and/or operator information. The SMS message may be transmitted to the monitoring device 107 from the MA number or communicated in another manner such as using the local number or email. In the case of transmission using the MA number, the agency service 115 may minimally prepend the notification with contact information and whether the contact is receiving the SMS from or sending the SMS to the operator (e.g., From/To: [contact number]|The meeting is at 10 am) as the monitor can identify the operator from the MA number.

Monitoring an Operator Device

Figure 6:
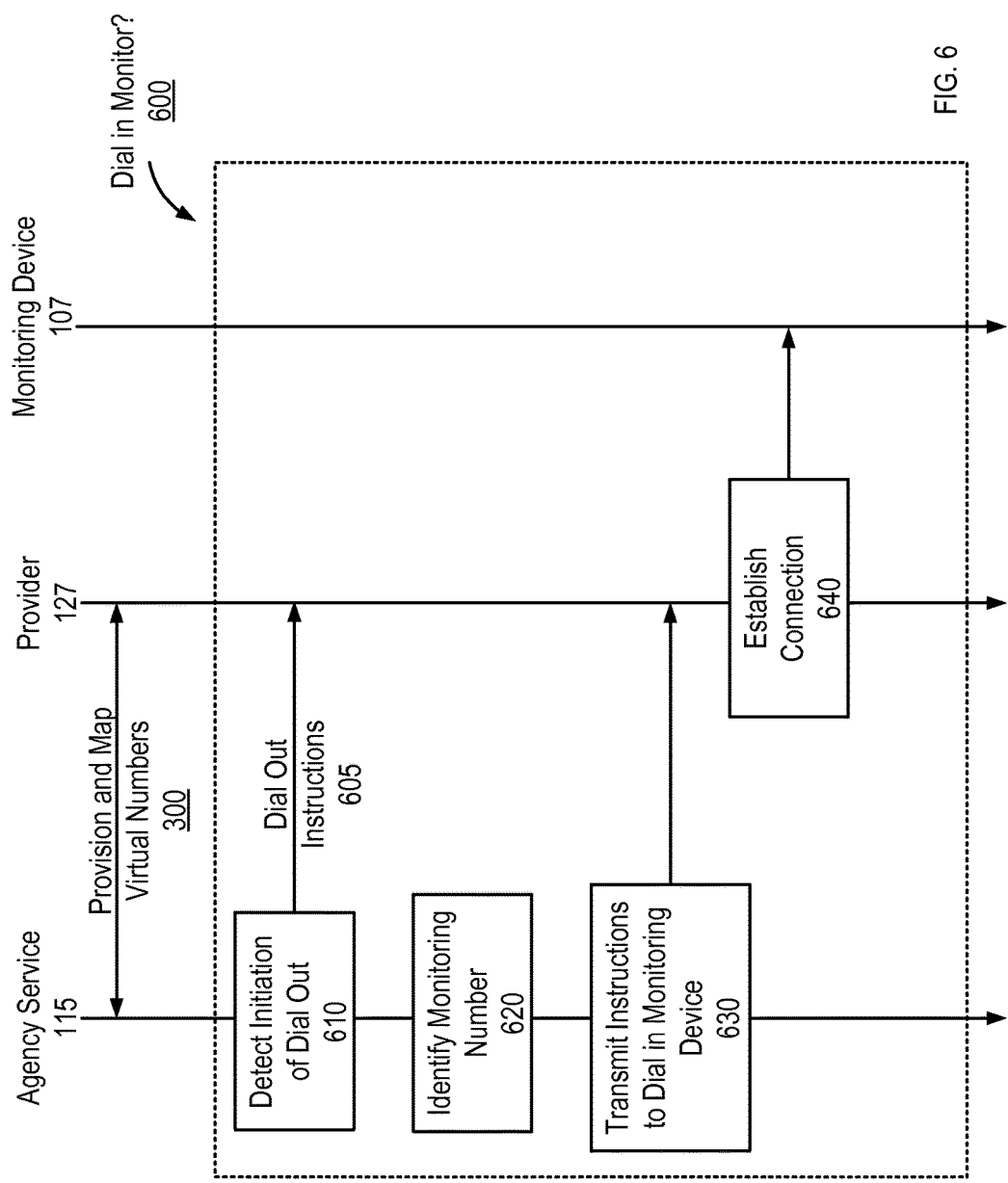
FIG. 6 is an interaction diagram illustrating a method for dialing in a monitoring device to monitor an operator device according to one example embodiment.

FIG. 6 is an interaction diagram illustrating a method for dialing in 600 a monitoring device 107 to monitor an operator device 101 according to one example embodiment. As described above, the agency service 115 and/or provider 127 may provision virtual numbers and store mapping information 300 for the virtual numbers in mapping table (e.g., as shown in FIG. 3D). In some embodiments, the agency service 115 may store a mapping table associating MA numbers with monitoring numbers (transmitting numbers of monitoring device 107) to identify monitoring device for automatically receiving call audio between a operator device 101 and contact device 105.

In one embodiment, the agency service 115 detects 610 the initiation of a dial out using a MA number. For example, the agency service 115 may detect when dial out instructions 605 are transmitted to the provider 127 or processed at the provider to perform a dial out. The dial out instructions 605 may comprise instructions for the provider 127 to establish a connection between a contract device 105 and operator device 101 using a MA number. For example, as shown in FIG. 5A, the agency service 115 may detect when the provider 127 receives the dial out number transmitted 510 by the operator device or when the provider 127 begins to dial out 515 to the content. In another example, as shown in FIG. 5B, the agency service 115 may detect when an operator number is transmitted 510 to the provider 127 or when the provider 127 begins to dial out 515 to the operator.

Once the agency service 115 detects 610 the initiation of a dial out by way of a MA number, the agency service identifies 620 any monitoring numbers associated with the MA number in the mapping table (e.g., as shown in FIG. 3D). In turn, the agency service 115 transmits instructions 630 to the provider 127 for dialing in the monitoring device to receive call audio on the MA number. The agency service 115 may identify 620 multiple monitoring numbers and transmit instructions enabling multiple monitoring device 107 to receive call audio.

The provider 127 receives the instructions and establishes 640 a connection with the monitoring device 107. For example, the provider 127 may dial in the monitoring device 107 from the MA number associated with the monitoring number (transmitting number) of the monitoring device. While the monitoring device 107 is being dialed in, a connection between contact device 105 and operator device 101 may be in the process of being established or already established. In either instance, the provider 127 may disable audio from the monitoring device 107 such that the contact is (or will be) unaware of the monitor's presence on the line. In another example embodiment, the provider 127 may establish 640 the connection with the monitoring device 107 through a local number.

In some instances, the connection with the monitoring device 107 may be established prior to the connection between the contact device 105 and operator device 101, for example, if the monitor answers the dial in before both of the contact device 105 and operator device 101. In turn, the agency service 115 and/or the provider 127 may inform the monitor of the status of the connection between the contact device 105 and the operator device 101. For example, the provider 127 may play an audio message "Please wait while the parties are connected."

In some instance, the connection with the monitoring device 107 may be established after the connection between the contact device 105 and operator device 101 has ended, for example, the call between the contact and operator lasts only 10 seconds and the monitor answers the dial in at 13 seconds. In turn, the agency service 115 and/or the provider 127 may inform the monitor of the status of the connection between the contact device 105 and the operator device 101. For example, the provider 127 may play an audio message "The call has already ended, Goodbye."

Additionally, the agency service 115 and/or the provider 127 may prompt the monitor to enter a key-in or key selection within a predetermined period of time from initiating the dial in 600. For example, when establishing 640 the connection the monitor may be required to "Press 1 to join the call in progress" (e.g., in response to an audible prompt), where pressing 1 causes the provider to connect the monitoring device 107. Providing the key-in or key selection indicates to the provider 127 that the monitor is on the line and optionally authenticates the monitor. Failure to provide the key in or key selection within the predetermined period of time may cause the provider 127 to terminate the connection, thus preventing a partial conversation between the contact and operator from being saved to the monitor's voicemail or an unauthorized person from monitoring the call.

FIGS. 7A and 7B are example interaction diagrams illustrating methods for monitoring 700 an operator device 101 according to an embodiment. A monitoring device 107 may monitor 700A, 700B, 700C the operator device 101 using the example processes outlined below.

As described above, and illustrated in FIG. 7A, the agency service 115 receives 710A collected data from the operator device and/or the provider 127. Additionally, the provider 127 may receive data 710B from the operator device 101. The collected data 710 may include call audio between the operator and the contact, GPS data, etc. In turn, the agency service 115 and/or provider 127 may update 530 the appliance at the agency 110.

Referring to FIG. 7A, in one embodiment, the monitoring device 107 connects 400 to a local number or MA number for monitoring 700A the operator device 101. The monitoring device 107 may be connected 400 by answering an incoming call from the local or MA number initiated by the provider 127 or dialing a virtual number directly as described with reference to FIG. 4.

Once the connection between the monitoring device 107 and the MA number or local number is established, the monitoring device 740 receives the live audio transmitted between the operator device 101 and the contact device 105. To continue monitoring 700A the operator device 101, the monitoring device 107 simply maintains the connection 400 with the virtual number.

In another embodiment, the monitoring device 107 connects 750 to the agency service 115 and/or appliance 150 for monitoring 700C the operator device 101. The monitoring device 107 may establish the connection 750 using a web browser or monitoring module 143 that retrieves or streams collected data via a monitoring interface on the appliance 150 or agency service 115 (e.g., monitoring interface 145).

In one example embodiment, the monitoring device 107 streams 660 audio and/or location measurements in real-time from the agency service 115. In addition, the monitoring device 107 can retrieve 670 historical data stored on the appliance 150 to view previously recorded operator device 101 operating sessions 500. In some embodiments, the appliance 150 also supports real-time monitoring.

Referring now to FIG. 7B, in another embodiment, the monitoring device 107 receives 600 a dial in to monitor 700C call audio, for example on the MA number being used to established the connection between the contact device 105 and the operator 101. The monitoring device 107 may receive 600 the dial in as a connection request from the MA number or alternatively, a local number associated with the MA number.

If the monitoring device 107 answers the dial in request, the provider 127 establishes a connection between the monitoring device 107 and the MA number or local number. Once the connection is established, the provider 127 ensures the monitoring device 107 receives 740 the live audio transmitted between the operator device 101 and the contact device 105. To continue monitoring 700C the operator device 101, the monitoring device 107 simply maintains the connection. In order to avoid alerting the contact to the monitor device's 107 presence on the line, the provider 127 may disable incoming audio from the monitoring device. As the monitoring device 107 may receive the dial in 600 in real-time with the call between the contact and the operator (e.g., as the connection between the operator device 101 and contact device 105 is being established, or subsequent to the operator device 101 and contact device 105 being connected), the agency service 115 and/or provider 127 may receive 710 data such as call audio, GPS, etc. and/or update 530 the appliance prior to, during, and/or subsequent to monitoring process 700C.

Additionally, the monitoring module 143 may interface with the native dialer of the monitoring device 107 and notify the monitor when a dial in is received 600. The monitoring module 143 may display information associated with the dial in such as number information for the parties and MA number being used - - - - -, mapping information, and/or case information stored at the agency service 115, provider 127, and/or appliance 150. For example, the monitoring module 143 may communicate with the agency service 115 and/or appliance 150 to receive mapping information and case information corresponding to MA numbers (and operating devices) the transmitting number of the monitoring device 107 executing the monitoring module 143 is authorized to monitor.

In some instances, the monitoring device 107 receives notifications from the monitoring interface 145 for display in the web browser or with the monitoring module 143. Example notifications include audio or visual alerts for notifying personnel if the operator device 101 stops transmitting real-time data (e.g., ends the call). In some embodiments, the monitoring device 107 may also retrieve or receive SMS communications between the operator device 101 and the contact device 105 using the monitoring interface 145 for display in the web browser, with the monitoring module 143, or via a SMS generated for the monitoring device, e.g., prepended with contact information (and optionally MA number and/or contact information).

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method comprising:
    configuring a virtual number with a provider of the virtual number, the virtual number configured with number information operable on a public switched telephone network (PSTN) and to playback a specified ring tone to telephonic devices requesting to connect to the virtual number, the virtual number associated with a transmitting number on the PSTN corresponding to an operator device in a mapping table and the specified ring tone spoofing the location of the operator device;
    receiving information in response to a request from a telephonic device to connect to the virtual number associated with the operator device, the information including a transmitting number on the PSTN corresponding to the telephonic device and the virtual number, the telephonic device receiving audio corresponding to the specified ring tone spoofing the location of the operator device;
    automatically identifying the telephonic device as the operator device or a contact device based on a comparison of the transmitting number on the PSTN of the telephonic device with the transmitting number on the PSTN of the operator device stored in association with the virtual number in the mapping table;
    in response to identifying the telephonic device as the contact device or the operator device, transmitting instructions for establishing a first connection between the contact device and the operator device through the virtual number for transmitting audio;

automatically identifying a transmitting number on the PSTN of a monitoring device stored in association with the virtual number in the mapping table; and automatically transmitting instructions for establishing a second connection with the monitoring device responsive to the identified transmitting number on the PSTN of the monitoring device, the second connection configured to:

permit the monitoring device to receive audio communications between the contact device and the operator device on the first connection; and prevent the contact device and the operator device from receiving audio associated with the second connection, the audio associated with the second connection comprising audio from establishing the second connection with the monitoring device and audio received on the second connection from the monitoring device for a duration of the second connection.

2. The method of claim 1, wherein identifying the telephonic device as the contact device comprises transmitting instructions for connecting the contact device with the operator device associated with the virtual number to establish the first connection.

3. The method of claim 1, wherein identifying the telephonic device as the operator device comprises receiving information including a transmitting number on the PSTN corresponding to a contact device from the operator device and transmitting instructions for connecting the operator device with the contact device through the virtual number to establish the first connection.

4. The method of claim 1, wherein the duration of the second connection comprises providing the audio communications between the operator device and the contact device on the first connection to the monitoring device over the second connection.

5. The method of claim 1, wherein the duration of the second connection comprises providing the audio communications between the operator device and the contact device on the first connection to the monitoring device over the second connection and terminating the second connection.

6. The method of claim 1, wherein the instructions establishing the second connection permitting the monitoring device to receive audio communications include instructions for connecting the monitoring device with a second virtual number and passing audio communications between the operator device and contact device to the second virtual number.

7. The method of claim 1, wherein the instructions establishing the second connection permitting the monitoring device to receive audio communications include instructions for connecting the monitoring device with the virtual number.

8. The method of claim 1, wherein the telephonic device is identified as the operator device in response to a match between the transmitting number of the telephonic device with the transmitting number of the operator device stored in association with the virtual number in the mapping table.

9. The method of claim 1, wherein the telephonic device is identified as the contact device in response to a lack of match between the transmitting number of the telephonic device with the transmitting number of the operator device stored in association with the virtual number in the mapping table.

10. The method of claim 1, further comprising:
provisioning the virtual number with the provider based on desired number information on the PSTN received for the virtual number;
receiving mapping information for the virtual number, the mapping information including the transmitting number corresponding to the operator device; and
storing the virtual number in the mapping table as a receiving number in association with the transmitting number corresponding to the operator device.

11. The method of claim 1, further comprising:
in response to the mapping table identifying the telephonic device requesting to connect to the virtual number as the contact device, transmitting instructions for continuing to play the specified ring tone to the contact device until the first connection between the contact device and the operator device is established.

12. The method of claim 1, wherein the specified ring tone spoofs the physical location of the operator device.

13. A system comprising:
a server comprising one or more processors and a non-transitory computer-readable storage medium storing computer program code, the computer program code when executed performing steps comprising:
configuring a virtual number with a provider of the virtual number, the virtual number configured with number information operable on a public switched telephone network (PSTN) and to playback a specified ring tone to telephonic devices requesting to connect to the virtual number, the virtual number associated with a transmitting number on the PSTN corresponding to an operator device in a mapping table and the specified ring tone spoofing the location of the operator device;
receiving information in response to a request from a telephonic device to connect to the virtual number associated with the operator device, the information including a transmitting number on the PSTN corresponding to the telephonic device and the virtual number, the telephonic device receiving audio corresponding to the specified ring tone spoofing the location of the operator device;
automatically identifying the telephonic device as the operator device or a contact device based on a comparison of the transmitting number on the PSTN of the telephonic device with the transmitting number on the PSTN of the operator device stored in association with the virtual number in the mapping table;
in response to identifying the telephonic device as the contact device or the operator device, transmitting instructions for establishing a first connection between the contact device and the operator device through the virtual number for transmitting audio;
automatically identifying a transmitting number on the PSTN of a monitoring device stored in association with the virtual number in the mapping table; and
automatically transmitting instructions for establishing a second connection with the monitoring device responsive to the identified transmitting number on the PSTN of the monitoring device, the second connection configured to:
permit the monitoring device to receive audio communications between the contact device and the operator device on the first connection; and
prevent the contact device and the operator device from receiving audio associated with the second connection, the audio associated with the second connection comprising audio from establishing the second connection with the monitoring device and audio received on the second connection from the monitoring device for a duration of the second connection.

14. The system of claim 13, further comprising:
a second server comprising one or more processors and a computer-readable storage medium storing computer program code, the computer program code when executed performing steps comprising:
identifying connection requests from telephonic devices to the virtual number;
receiving instructions for dialing out to telephonic devices;
establishing connection between the contact device and the operator device; and
recording audio received from the contact device and the operator device.

15. The system of claim 13, wherein identifying the telephonic device as the contact device comprises transmitting instructions for connecting the contact device with the operator device associated with the virtual number to establish the first connection.

16. The system of claim 13, wherein identifying the telephonic device as the operator device comprises receiving information including a transmitting number on the PSTN corresponding to a contact device from the operator device and transmitting instructions for connecting the operator device with the contact device through the virtual number to establish the first connection.

17. The system of claim 13, wherein the instructions establishing the second connection permitting the monitoring device to receive audio communications include instructions for connecting the monitoring device with a second virtual number and passing audio communications between the operator device and contact device to the second virtual number.

18. The system of claim 13, wherein the instructions establishing the second connection permitting the monitoring device to receive audio communications include instructions for connecting the monitoring device with the virtual number and passing audio communications between the operator device and contact device to the second virtual number.

19. The system of claim 13, further comprising:
in response to the mapping table identifying the telephonic device requesting to connect to the virtual number as the contact device, transmitting instructions for continuing to play the specified ring tone to the contact device until the first connection between the contact device and the operator device is established.

20. The system of claim 13, wherein the specified ring tone spoofs the physical location of the operator device.

21. A computer based method comprising:
configuring a virtual number with a provider of the virtual number, the virtual number configured with number information operable on a public switched telephone network (PSTN) and to playback a specified ring tone to telephonic devices requesting to connect to the virtual number, the virtual number associated with a transmitting number on the PSTN corresponding to an operator device in a mapping table and the specified ring tone spoofing the location of the operator device;
receiving information in response to a request from a telephonic device to connect to the virtual number, the information including a transmitting number on the PSTN corresponding to the telephonic device and the virtual number, the telephonic device receiving audio corresponding to the specified ring tone spoofing the location of the operator device;
identifying the telephonic device as the operator device or a contact device based on a comparison of the transmitting number on the PSTN of the telephonic device with the transmitting number on the PSTN of the operator device stored in association with the virtual number in the mapping table; and
in response to identifying the telephonic device as the contact device, transmitting first instructions for establishing a first connection between the contact device and the virtual number and transmitting second instructions for establishing a second connection between the operator device and the virtual number, the first instructions causing the specified ring tone to continue playing for the contact device until the second connection between the operator device and the virtual number is established.

22. The method of claim 1, wherein audio from establishing the second connection with the monitoring device comprises tones associated with dialing the monitor device.

23. The system of claim 13, wherein audio from establishing the second connection with the monitoring device comprises tones associated with dialing the monitor device.

\* \* \* \* \*